(12) United States Patent
Garcia-Brosa

(10) Patent No.: US 11,257,013 B2
(45) Date of Patent: Feb. 22, 2022

(54) COORDINATED DELIVERY OF DINING EXPERIENCES

(71) Applicant: Martin Garcia-Brosa, Cutler Bay, FL (US)

(72) Inventor: Martin Garcia-Brosa, Cutler Bay, FL (US)

( * ) Notice: Subject to any disclaimer, the term of this patent is extended or adjusted under 35 U.S.C. 154(b) by 0 days.

(21) Appl. No.: 17/173,983

(22) Filed: Feb. 11, 2021

(65) Prior Publication Data

US 2021/0248530 A1    Aug. 12, 2021

Related U.S. Application Data

(63) Continuation-in-part of application No. 17/173,848, filed on Feb. 11, 2021.

(Continued)

(51) Int. Cl.
*G06Q 10/06* (2012.01)
*G06Q 50/12* (2012.01)
(Continued)

(52) U.S. Cl.
CPC .  *G06Q 10/06311* (2013.01); *G06Q 10/06312* (2013.01); *G06Q 10/06315* (2013.01);
(Continued)

(58) Field of Classification Search
CPC ....... G06Q 10/06311; G06Q 10/06315; G06Q 10/06312; G06Q 10/0833; G06Q 10/0832;
(Continued)

(56) References Cited

U.S. PATENT DOCUMENTS 10,366,436 B1 *  7/2019  Kumar ............... G06Q 30/0635
10,467,559 B1 * 11/2019  Svenson ............. G06Q 20/209
(Continued)

OTHER PUBLICATIONS

Predicting order lead time for just in time production system using various machine learning algorithms: A case study S Singh, U Soni—2019 9th International Conference on Cloud . . . , 2019—ieeexplore.ieee.org (Year: 2019).*

(Continued)

*Primary Examiner* — Jonathan G Sterrett
(74) *Attorney, Agent, or Firm* — Bekiares Eliezer LLP

(57) ABSTRACT

According to one aspect, a method for executing a multi-restaurant order, may be provided; the method comprising: receiving a multi-restaurant order comprising requesting a plurality of order items associated with a plurality of restaurants from a customer; calculating a time to begin preparing a first order item associated with a first restaurant; calculating a time to begin preparing a second order item associated with a second restaurant; comparing the times; scheduling, based on the comparing, a first time to begin preparation of the first order item and a second time to begin preparation of the second order item; transmitting the first and second time to begin preparation to the first and second restaurant, respectively; generating a plurality of proposed pickup times, based on the scheduling, of the first order item and the second order item; and transmitting the plurality of proposed pickup times to a driver management module.

20 Claims, 25 Drawing Sheets

Related U.S. Application Data

(60) Provisional application No. 62/972,762, filed on Feb. 11, 2020.

(51) Int. Cl.
  *G06Q 10/08* (2012.01)
  *G06Q 20/10* (2012.01)

(52) U.S. Cl.
  CPC ..... *G06Q 10/0832* (2013.01); *G06Q 10/0833* (2013.01); *G06Q 10/08355* (2013.01); *G06Q 20/102* (2013.01); *G06Q 50/12* (2013.01)

(58) Field of Classification Search
  CPC . G06Q 10/08355; G06Q 50/12; G06Q 20/102
  See application file for complete search history.

(56) References Cited

U.S. PATENT DOCUMENTS

| | | | |
|---|---|---|---|
| 10,467,599 | B1 | 11/2019 | Gardner et al. |
| 10,915,848 | B2* | 2/2021 | Romano .......... G06Q 10/06395 |
| 10,977,604 | B2* | 4/2021 | Berdinis .......... G06Q 10/06315 |
| 2005/0004843 | A1* | 1/2005 | Heflin .................... G06Q 10/08 705/15 |
| 2014/0011522 | A1* | 1/2014 | Lin ....................... H04W 4/029 455/456.2 |
| 2014/0214465 | A1* | 7/2014 | L'Heureux ........ G06Q 30/0603 705/7.13 |
| 2014/0330738 | A1 | 11/2014 | Falcone et al. |
| 2015/0019354 | A1 | 1/2015 | Chan et al. |
| 2015/0262121 | A1 | 9/2015 | Riel-Dalpe et al. |
| 2015/0271290 | A1* | 9/2015 | Tao .................... H04L 41/5051 709/217 |
| 2015/0348064 | A1* | 12/2015 | Harman ............... G06Q 10/107 705/14.66 |
| 2019/0130354 | A1* | 5/2019 | Han ................... G06Q 10/0833 |
| 2019/0228463 | A1* | 7/2019 | Chan ................. G06Q 30/0621 |
| 2020/0065734 | A1* | 2/2020 | Szybalski .......... G06Q 30/0635 |
| 2021/0019694 | A1* | 1/2021 | Dhesi .................. G06Q 10/087 |
| 2021/0248695 | A1 | 8/2021 | Garcia-Brosa |

OTHER PUBLICATIONS

A multi-echelon integrated JIT inventory model using the time buffer and emergency borrowing policies to deal with random delivery lead times HN Chiu, HL Huang—International journal of production research, 2003—Taylor & Francis (Year: 2003).*
https://www2.isye.gatech.edu/~mgoetsch/cali/VEHICLE/VR1A007_.HTM, retrieved from the web Jul. 26, 2021 (Year: 2021).*
The vehicle routing problem: A taxonomic review B Eksioglu, AV Vural, A Reisman—Computers & Industrial Engineering, 2009—Elsevier (Year: 2009).*
The meal delivery routing problem D Reyes, A Erera, M Savelsbergh . . .—Optimization . . . , 2018—optimization-online.org (Year: 2018).*
PCT Application No. PCT/US21/17721 filed Feb. 11, 2021, entitled: Coordinated Delivery of Dining Experiences, Inventor: Martin Garcia-Brosa (copy available in IFW).
International Search Report and Written Opinion dated Jun. 11, 2021 cited in Application No. PCT/US21/17721, 15 pgs.
S. Singh et al., "Predicting Order Lead Time for Just in Time production system using various Machine Learning Algorithms: A Case Study," 9th International Conference on Cloud Computing, Data Science & Engineering (Confluence), 2019, from IEEE Xplore, pp. 422-425.
H.N. Chiu et al., "A multi-echelon integrated JIT inventory model using the time buffer and emergency borrowing policies to deal with random delivery lead times," Taylor & Francis Group, International Journal of Production Research, 2003, vol. 41, No. 13, pp. 2911-2931.

* cited by examiner

COORDINATED DELIVERY OF DINING EXPERIENCES

RELATED APPLICATION

This application is a Continuation-In-Part of U.S. application Ser. No. 17/173,848 filed Feb. 11, 2021, which claims priority to U.S. Provisional Application No. 62/972,762 filed Feb. 11, 2020, which are hereby incorporated by reference herein in their entirety.

It is intended that the above-referenced application may be applicable to the concepts and embodiments disclosed herein, even if such concepts and embodiments are disclosed in the referenced applications with different limitations and configurations and described using different examples and terminology.

FIELD OF DISCLOSURE

The present disclosure relates to devices, systems, and methods for coordinating the delivery of a dining experience to customers, for example, through a food delivery service.

BACKGROUND OF THE DISCLOSURE

Generally, customers desiring particular order items must determine particular restaurants that can prepare such order items, order said order items, and either pick up the order items or have them delivered. In some scenarios, a particular restaurant may only offer a portion of the desired order items, for example, an appetizer, while a second restaurant may offer a different portion, for example, an entrée. In these scenarios, the customer must pick up each order item individually, or have them delivered from multiple food delivery providers. It follows, that these order items may be at an unideal temperature when delivered or picked up due to the multiple stops involved in completing acquisition from multiple restaurants or arrive at different moments.

Further still, groups of people, such as families or those residing the same household, may have individuals that desire to order items from different restaurants, but plan to eat the order items at the same time. Conventional delivery solutions do not enable a multi-restaurant, multi-person group order comprised of a plurality of order items, all associated with different restaurants and different individuals within the group, to be coordinated for timed delivery, through a single order.

Accordingly, there remains a need for coordinated preparation and delivery of dining experiences that overcome these and other drawbacks. These and other needs are satisfied by the various aspects of the present disclosure.

BRIEF OVERVIEW OF THE DISCLOSURE

In accordance with the purposes of the disclosure, as embodied and broadly described herein, the disclosure, in one aspect, relates to coordinating the delivery of a dining experience to customers, for example, through a food delivery service.

According to one aspect, a software-based operation and management platform is provided to manage certain preparation, pickup, and delivery orders. The platform may be used by multiple restaurants, regardless of their facility location. Moreover, the platform may also be used by common kitchen facilities, as will be further detailed below.

The software can control various aspects related to the food preparation, timing, and scheduling of pickups and delivery. The software can also manage the same activities in regard to preparation, timing, scheduling of pickups of food providers outside of the building, in combination with restaurants in a common kitchen facility. The software can allow a customer to define a delivery time for a multi-restaurant order and schedule the activities of the restaurants participating in the order, considering preparation and delivery/traffic time in the planning.

According to additional aspects, the scheduling will consider the preparation time of each recipe and may include a database with the preparation time per recipe per restaurant.

According to additional aspects, the scheduling will consider the delivery and pickup delay/time of each recipe and may include a database with the delivery times and/or pickup times per restaurant.

According to additional aspects, the scheduling will consider traffic delays, temperature increase/decrease based on travel time, weather, and other potential delays and impacts in delivering a desirable dining experience.

According to additional aspects, digital marketing services and monetization services may be provided to platform users to facilitate growth of their business and geographical presence.

According to one aspect, a building (e.g., a warehouse-like facility) with many commercially operable kitchens may be provided. A "tenant" of such a facility would be a food provider such as, for example, a restaurant or a virtual restaurant that desires to have a kitchen in the building. As used herein, virtual restaurants can be defined as restaurants with a brand that only sell through delivery, or do not have a physical establishment for customers to dine within.

It is noted that expanding to additional locations and, thus, additional geographic territories, enables the expansion of the restaurant's prospective customer base. By renting a kitchen in a facility consistent with aspects of the present disclosure, a restaurant can expand its territory without committing additional resources beyond the kitchen and cook/s, thereby saving on dine-in resources such as staff, tables, supplies, service, and other patron servicing requirements. This facilitates the restaurant to gain market share on purely delivery and carry-out customers, leading to higher margins on their products. By the transient nature of a kitchen rental, the restaurant may obtain the data it needs to decide if the new location warrants an expansion of its dine-in segment.

It is further anticipated that aspects of the disclosure will benefit consumers as well as restaurants. For instance, a consumer may desire an 'appetizer' from a first restaurant, but an 'entree' from a second restaurant. There is no current solution that would enable the consumer to receive both items, from different restaurants, at the same time, using the same delivery service, within a reasonable time such that the food, when received, remains at a reasonable temperature for consumption. Additionally, the consumer could schedule the delivery time of its multi-restaurant order, and aspects disclosed herein will organize the preparation of the food at the restaurants providing the order, considering preparation and delivery times, including traffic.

Moreover, there is no current solution that enables a restaurant to synchronously time the preparation of their food in conjunction with a multi-stop route by a decentralized driver. Thus, management software aspects of the present disclosure may be comprised of components including: 1) consumer-facing, multi-restaurant piecemeal delivery; and, 2) management of decentralized food preparation from multiple restaurants as applied to the same order. It should be noted that, in certain embodiments, the multi-point delivery may all be from the same warehouse comprising different kitchens.

Moreover, by enabling such piecemeal delivered from a plurality of food providers, this not only benefits the customer, but the food provider may stand to increase sales. The restaurant can increase sales—and not just by geographic expansion alone, but by enabling customers to only order their favorite items from their favorite restaurant, whereas before they would face an 'all or nothing' decision.

Generally, according to aspects of the disclosure, a method of delivery of a dining experience can include presenting a menu or multiple menus from different restaurants to a customer, receiving a request from the customer including at least one order item, and coordinating completed order pickup from one or more restaurants by a delivery provider such that a consistent and pleasing dining experience is provided to the customer.

The method of delivery of the dining experience can also include associating traffic data, weather data, ranking data, and/or other applicable data to match delivery providers with restaurants such that the consistent and pleasing dining experience is facilitated. Delivery providers may be affiliated with the food provider (e.g., the restaurant) by way of, for example, but not limited to, employment, contracting, or third-party selection through the platform of the present disclosure.

In still further aspects, the disclosure also relates to devices and systems utilizing or facilitating the methods described herein.

Aspects of the disclosure may enable a multi-restaurant, multi-person group order comprised of a plurality of order items, all associated with different restaurants and different individuals within the group, to be coordinated for timed delivery, through a single order. Advantages may include, but not be limited to, the timing of multiple order items, from multiple sources, to multiple individuals, to ensure that each order item is in optimal condition upon arrival, as well as timed to arrive relatively with the other order items in the order. In this way, in one non-limiting example, family members or co-workers desiring to eat together, but with preferences on order items at different restaurants, may enjoy a coordinated delivery of the order items such that the order items may be received at relatively the same time.

Providing the aforementioned aspects may include the proper timing of food preparation of restaurants, as well as the timed dispatch of one or more delivery providers to pick up, route, and delivery the order items at relatively the same time, in optimal condition. Consolidating orders from multiple individuals and a plurality of restaurants may provide an economical advantage to a user of the present disclosure. The user may only be required to pay one fee for the entire order in the present disclosure, rather than separate fees from each restaurant and/or deliver service they may have otherwise ordered from.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate several aspects of the disclosure and together with the description, serve to explain the principles of the disclosure.

DETAILED DESCRIPTION OF THE DISCLOSURE

Figure 1:
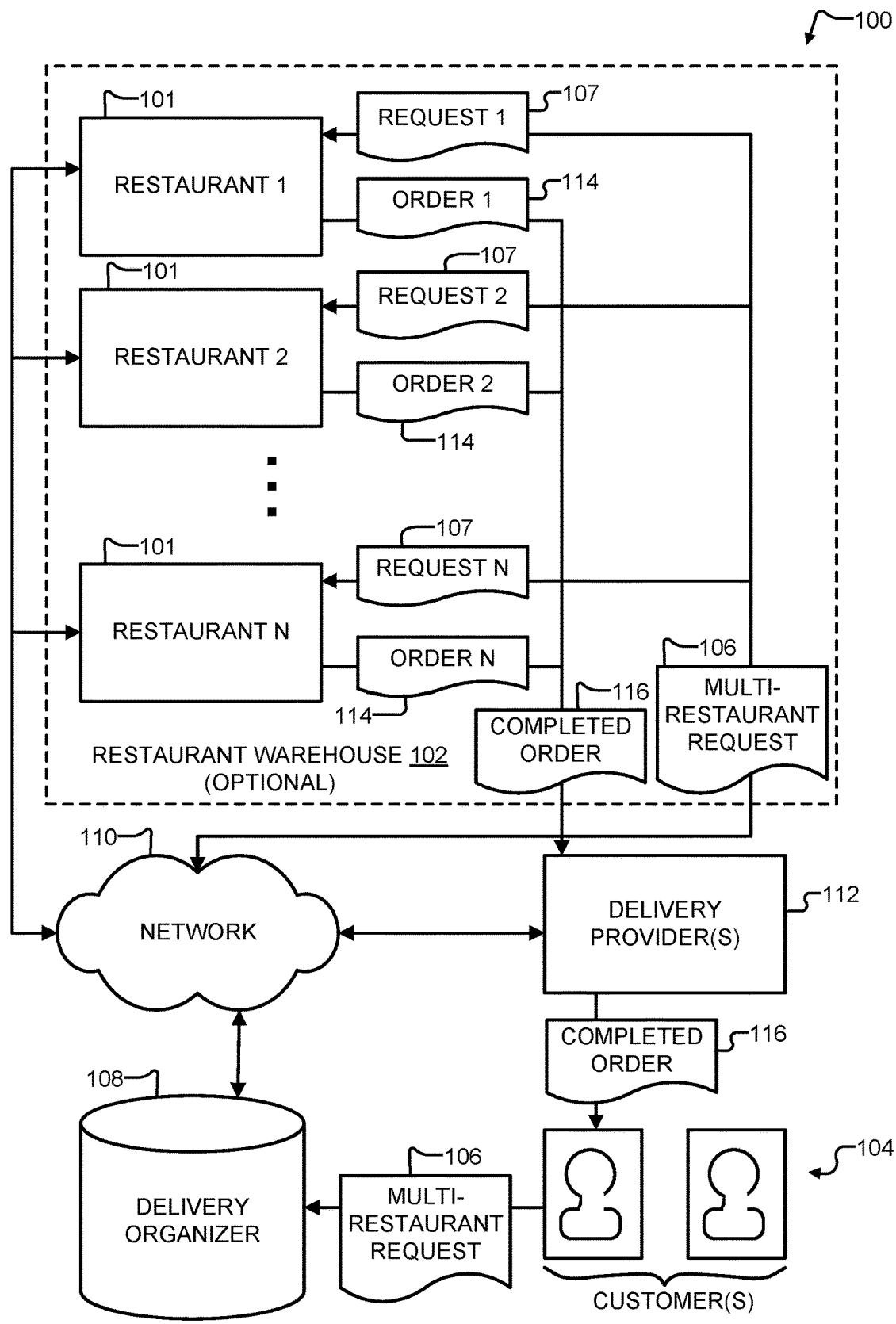
FIG. 1 is an overview of a system or platform 100, according to an exemplary embodiment of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of multi-restaurant, multi-person orders, embodiments of the present disclosure are not limited to use only in this context, and may be applicable to any circumstances in which similar methods of logistics and operational management are employed.

Platform Overview

As briefly described above, the present disclosure relates, in various aspects, to methods, devices, and systems for coordinated delivery of dining experiences to customers. Turning now to the figures, several aspects of the present disclosure are described in detail. It is noted that the drawings are not to scale, and are not exhaustive of all aspects of the present disclosure.

In a first aspect of the present disclosure, embodiments provide for a multi-kitchen, multi-brand and/or multi-restaurant (collectively referred to as multi-restaurant) ordering, management, and delivery logistics platform. As will be detailed, embodiments herein provide for a consumer interface for placing a multi-restaurant ordering software application interface. Furthermore, embodiments herein provide for a kitchen-management platform that orchestrates the preparation sequence and timing of various orders at each kitchen relevant to a multi-restaurant order placed via the consumer interface. Further still, embodiments of the present disclosure provide for a delivery management platform that coordinates a decentralized network of delivery vehicles, as such may be contemplated to be human-operated or autonomous delivery, for the proper dispatch, routing, and overall timing in the fulfillment of the multi-restaurant order. Said embodiments may be integrated into various decentralized ordering and delivery platforms, including integration with ride-share service providers. In this way, for the same order, multiple restaurants as well as multiple delivery providers may be used to deliver the same order comprised of multiple order items from a different location. Accordingly, each restaurant, regardless of its platform, and each delivery provider, regardless of its platform, may be enabled and/or configured to communicate with the centralized coordinating platform of the present disclosure, thereby leveraging multiple sources and delivery assets in facilitating a single order. Thus, a first restaurant may be different in technical implementation from a second restaurant, but still in bi-directional communication with the central platform for the purposes of unified order fulfillment.

Similarly, a first delivery unit may be from a first delivery network, while a second delivery unit may be from a second delivery network, all in bi-directional communication with the central platform for the purposes of unified order fulfillment.

Accordingly, in the first aspect, embodiments of the present disclosure enable multi-restaurant orders to be placed, received, and processed through a consumer facing platform. In further embodiments, as will be detailed with regard to additional aspects, multiple users may be enabled to aggregate their ordered order items from multi-restaurants into a single orchestrated order for coordinated fulfillment.

Subsequently queued and processed in a kitchen management platform for the orchestration of multi-kitchens and coordination of timing within each kitchen. By way of non-limiting examples, the platform may take into consideration the recipe parameters, the location of the kitchen, the preparation time, the serving parameters, and various other consideration relating to the timely and proper (e.g., temperature) delivery of the multi-restaurant order, in view of the related parameters for the other kitchens pertaining to the same multi-restaurant order. In this way, the platform may instruct when the kitchen should commence preparation of an order item with that kitchen.

Still referencing the first aspect, the delivery management platform may be enabled to dispatch drivers in a decentralized network of drivers. It should be understood that, although the terms 'driver' is used, any means by which the transportation of the multi-restaurant order to the customer may be employed, including, but not limited to, drone-based delivery. In additional aspects, one or more drivers may be dispatched, and at varying times, to ensure the timely and proper fulfillment of the multi-restaurant and group orders.

The various embodiments herein may be managed in a centralized computing platform. That is, the consumer interface, the kitchen management, and the delivery management platforms may be management by a larger, centralized platform for coordinating the multiple aspects described herein. Moreover, the various platforms may be, in part or in whole, integrated with other platforms such as pre-existing consumer interfaces, pre-existing kitchen management interfaces, and pre-existing delivery management solutions. In this way, the various embodiments herein may be codified as an API and/or SDK for integration with various technical platforms. Together, the platform may provide for the optimized fulfillment of multi-restaurant orders for one or more consumers, by way of an orchestrated process flow that is "transparent" (e.g., not disruptive of ordinary operations) to any single party involved in the process.

In a second aspect of the present disclosure, methods, systems, and computer-readable media may be provided to solve one or more problems in conventional solutions. The first problem relates to the facilitation of group orders. Conventionally, facilitating group orders is cumbersome and difficult. A primary user may be responsible for facilitating their order on a single account. This process becomes exponentially more complicated the more people are involved in the order and when different people prefer to order items from different restaurants. Here, the placing of multiple orders, from multiple restaurants, on behalf of multiple people is technically constrained by current software solutions. Finally, the process of aggregating payment details and information, whether through the ordering platform, or outside of the ordering platform, is further technically constrained by the lack of interface for obtaining fee splits for multi-person, multi-restaurant group orders. It should be understood that the various embodiments may refer to multi-person orders may also apply to single-person orders.

It is noted that "order items," "items" and/or "order items" may be interchangeable with the following: at least one product, at least one food product, at least one restaurant item, at least one portion of an order item, and at least one portion of a product.

To address these problems, embodiments of the present disclosure enable a multi-person, multi-device aggregation of a single, multi-restaurant order. In this way, embodiments of the present disclosure may be used to construct a unified multi-restaurant order, from one or more restaurants, with one or split payments, in a single process, using on or more devices to input, track, and transact the parameters of the multi-restaurant order. In some embodiments, a unifying multi-restaurant order may be constructed through a platform consistent with embodiments herein. Here, different users may access the same platform and input the parameters of their portion of the multi-restaurant order and payment information. In turn, the order items from the various users may be aggregated and placed as a single order into the platform.

Still, consistent with embodiments of the present disclosure, multiple desperate order items may be tagged and aggregated to form a unifying multi-restaurant order. For example, a first user may place a first order for a first order item at a first restaurant and complete the first order, while a second user may place a second order for a second order item at a second restaurant and complete the second order. The plurality of orders may have been placed on the same or different platforms. In turn, various methods and systems may be employed to propose that the separate orders may be aggregated to form a unifying multi-restaurant order, managed for optimal delivery. Such proposal may be triggered based on the plurality of orders being received, at approximately the same time, for delivery to the same address. This problem may have been solved by some of the prior art findings we discovered. Thus, any one of the aforementioned elements may only form a component of an independent patent claim.

In a third aspect of the various embodiments presented herein, multi-restaurant orders for one or more consumers may be timed to arrive at a desired time or interval of times. This may be achieved, at least in part, through the timed dispatch of delivery drivers. For instance, embodiments of the present disclosure may provide for the incremental dispatch of delivery drivers as needed to fulfill a desired coordinated delivery of the plurality of order items. Here, the various components of the first and second aspects mentioned above and detailed herein, to deliver the food for multiple restaurants.

The platform may be configured schedule multiple delivery providers if required, in order for order items from different restaurants to arrive at the same time. As one example, the platform may set a constraint of thirty minutes for a delivery. That is, the platform will optimize the order items such that a hot dish would not spend more than thirty minutes in the vehicle until delivery, therefore the multi-restaurant order may require more than one driver for pickup. For instance, when a four-restaurant order fulfilled by only one driver would take over an hour to fulfill, the platform would dispatch additional drivers to maintain a thirty-minute maximum between the pickup of the hot dish until the moment of delivery.

Consistent with a fourth aspect of the present disclosure, embodiments of the present disclosure may provide a recommendation engine. The recommendation engine may assist a user in determining forming a multi-restaurant order through the consumer interface. The recommendation engine may employ various parameters in determining its recommendation. The parameters may comprise, but not be limited to, for example, a history of consumption, a characteristic of the user's order items (e.g., organic foods, low fat foods, low carb foods), an aspect of the user's diet (e.g., keto-friendly foods, gluten-free foods, and the like), and aspect of the ingredients within the order items that the user prefers (e.g., the user prefers recipes with cilantro, curry, or other commonly occurring ingredients), geographical origin, and other parameters. Further still, the recommendation engine may be configured to group certain restaurants and their items together for presentation to the user. In some embodiments, the idea of restaurant-based menus may be eliminated. Rather, a listing of items and/or corresponding brands may be presented to the user based on their preference. In this way, the origination of the order may not be relevant to the user, as they can place a multi-restaurant order through the embodiments herein.

Accordingly, various embodiments may provide a multi-restaurant, multi-person group order comprised of a plurality of order items, all associated with different restaurants and different individuals within the group, to be coordinated for timed delivery, through a single order. Such order may be facilitated through a consumer interface, a kitchen management platform, and a delivery and dispatch platform, all working together to provide for the present solution. The consumer interface may be configured to aggregate order items, for a plurality of individuals and a plurality of sources, into a unified order, and facilitate either single or split payments. The kitchen interface may be configured to coordinate the appropriate timing in the preparation of the order items in accordance with a target delivery time, across a plurality of kitchens, having taken into consideration, by way of non-limiting example, internal parameters (e.g., recipe, kitchen backlog, etc.) and external parameters (route, other kitchens in the order, delivery providers, etc.). The kitchen management platform may further indicate delays or changes in the order preparation. The delivery interface may be configured to route and dispatch, incrementally, as many delivery providers as necessary to fulfill the delivery of the ordered items within a given parameter (e.g., temperature), a threshold period of time, based on internal parameters (e.g., the food item parameters) and other parameters (e.g., traffic), and other factors, such that the multiple-drivers may deliver the items at relatively the same time.

Platform Architecture

FIG. 1 is an overview of a system or platform 100, according to an embodiment of the present disclosure. Platform 100 may, at any module, stage, and/or process comprise a User Interface ("UI"). Further, platform 100 may provide a set of instructions used to perform various functions such as, for example, guiding and/or directing a user of platform 100 in response to the user's actions and/or selections while using platform 100.

As illustrated, platform 100 includes an optional warehouse facility 102 where a plurality of restaurants 101 may be organized and situated for operation and preparation for food and recipes. As noted, the warehouse configuration 102 may be optional, or may be in combination with external restaurant facilities. Accordingly, the restaurants 101 may be external to a warehouse, internal to warehouse, or in combination internal and external to a warehouse.

By way of non-limiting example, platform 100 may be hosted on, for example, a cloud computing service. In some embodiments, the platform 100 may be hosted on a computing device 600. A user may access platform 100 through a software application and/or hardware device. The software application may be embodied as, for example, but not be limited to, a website, a web application, a desktop application, and a mobile application compatible with the computing device 600.

Still consistent with embodiments of the present disclosure, platform 100 may be, for example, but not limited to, a software development kit (SDK)/application programming interface (API). The SDK/API may be used by third parties to integrate some or all of the functions disclosed herein. Furthermore, the SDK/API may allow for the customization of some or all of the functions disclosed herein, to meet the needs of third parties implementing platform 100.

In yet further embodiments of the present disclosure, platform 100 may implement an SDK/API to integrate with third-party solutions. For example, and as mentioned below, platform 100 may integrate with a delivery provider's management platform to manage the delivery aspects disclosed herein. In yet another example, platform 100 may integrate with an inventory management platform used by, for example, restaurants. It should be understood that the SDK/API integrations may enable administers to selectively use and deploy various functions and features herein, in any customized integration with existing third-party platforms.

The platform 100 may include a network 110 to facilitate communication between the restaurants 101, between the restaurants 101 and a delivery provider 112, between the restaurants 101 and customers 104, and/or between the delivery provider 112 and customers 104.

In accordance with various embodiments disclosed herein, delivery provider 112 may be affiliated with the food provider (e.g., the restaurant 101) by way of, for example, but not limited to, employment, contracting, or third-party selection through platform 100 of the present disclosure. The selection may be provided by, either one of the restaurants 101 or the customer 104. Furthermore, these sections may be facilitated through platform 100. Further still, in some embodiments, the delivery provider 112 may comprise a delivery management platform that is in bi-directional communication with platform 100. In turn, the delivery management platform and platform 100 may share data, computer-instructions, and any other aspect to inform, commission, manage, or otherwise track the delivery status of the multi-restaurant order received by platform on customer 104.

Generally, the customers 104 may place a multi-restaurant request 106 comprising one or more order items or recipes associated with the restaurants 101. The multi-restaurant request 106 may also be a single restaurant request in some embodiments.

The multi-restaurant request 106 may be received and processed by a delivery organizer 108. The delivery organizer 108 may be a software component or a plurality of software components configured to execute computer-readable instructions associated with one or more of methods 200, 300, 400, and/or 500, which are described in more detail herein. In some embodiments, delivery organizer 108 may be configured to identify a time latency to begin a new order item preparation for each of the plurality of restaurants. In further embodiments, delivery organizer 108 may be configured to compare a plurality of predetermined preparation times of the one or more order items associated with the plurality of restaurants.

The delivery organizer 108 may be configured to process the multi-restaurant request 106 such that particular order items are ordered from particular restaurants 101, such that payment to the restaurants are effectively distributed, such that delivery provider 112 is effectively coordinated to facilitate delivery to customers 104, and such that payment to the delivery provider is effectively distributed. The delivery organizer 108 may use a web application, mobile application, or other interface to receive payment and requests from the customers 104.

Upon processing of the multi-restaurant request 106, the delivery organizer may distribute a series of processed requests 107 to each associated restaurant 101. Furthermore, the delivery organizer 108 may distribute the multi-restaurant request to the delivery provider 112. The processed requests 107 may include data relating to preparation times for each order item in the request 107, as well as recommended food preparation start times, estimated pickup times of the delivery provider 112, and other related data. Thus, it is anticipated to be within the scope of the present disclosure that platform 100 may provide instructions to, by way of non-limiting example, kitchen personnel.

In various embodiments, preparation times may be a data point available for each order item in the request 107. The data points may be provided by, for example, restaurant 101. For instance, during an on-boarding aspect of the restaurant's adoption of platform 100, or at any other point in time, preparation times for each order item may be received by platform 100. While, in other embodiments, the datapoints may be ascertained from various other databases.

It is noted, that according to some embodiments, the processed requests 107 may be provided to the restaurants 101 by the delivery provider 112. According to other embodiments, a portion of the processed requests 107 may be provided by the delivery organizer 108, while an additional portion may be provided by the delivery provider 112.

Responsive to receiving a request 107, the restaurants 101 may begin preparation of each associated order item or recipe such that the anticipated pickup times are met. According to some embodiments, the anticipated pickup times may be based on a window or sliding scale of time based on external factors, such as traffic, weather, and aspects of the recipe, including cooldown time (for hot recipes), heat up time (for cold or room temperature recipes such as salads, desserts, etc.), desired temperature at delivery, and other aspects. Furthermore, in some embodiments, a delivery driver profile may be provided. Said profile may include data, such as, but not limited to, various aspects of the delivery (e.g., thermal containers, chaffing tools, or coolers), that would factor into the delivery time calculation for ensuring timely delivery of a particular recipe.

Each order item prepared may be organized by the restaurants 101 include individual order item portions 114. The individual order item portions 114 may be collected by the delivery provider 112 and assembled into completed order item 116. The completed order item 116 may be stowed by the delivery provider for delivery to the customers 104.

According to some embodiments, the delivery provider 112 may stow all or a portion of the completed order item 116 into specialized temperature control apparatuses for maintaining a desirable temperature. Upon delivery, the completed order item 116 may be at a desirable temperature thereby ensuring a pleasing dining experience to the customers 104 as compared to conventional delivery services.

It is noted that the coordination of the delivery and payment to the restaurants 101 and delivery provider 112 may vary in many ways. Hereinafter, particular details related to methods of coordinating delivery of a dining experience are presented in detail.

Figure 7:
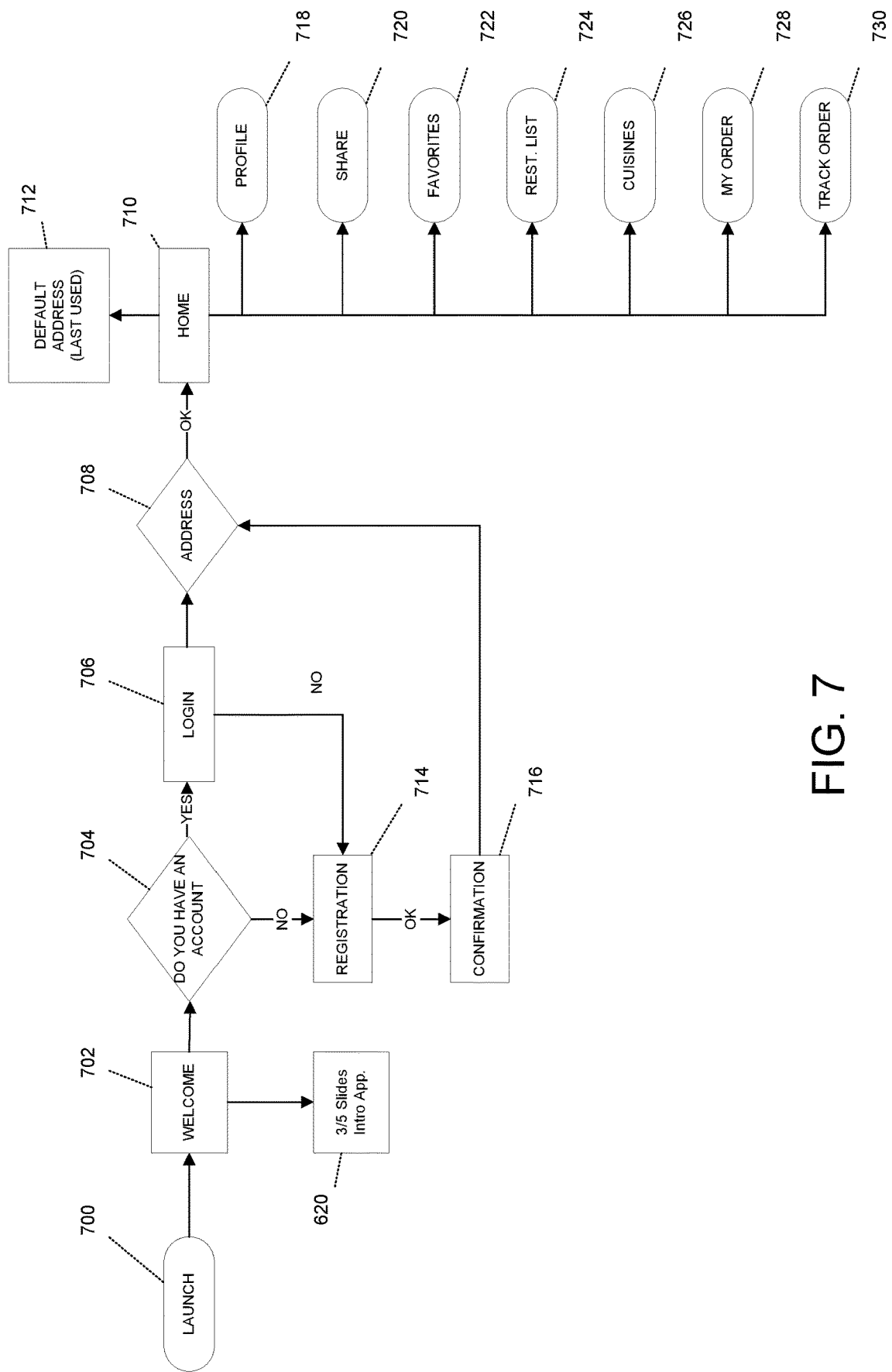
FIG. 7 illustrates a flow chart of a user launching platform 100 according to an embodiment of the present disclosure.

FIG. 7 illustrates a flow chart of a user launching system or platform 100. Upon launching platform 100 at step 700, the user may be forwarded to a welcome screen and/or page 702. Welcome screen and/or page 702 may comprise a prompt 704 to choose whether the user has an account or not.

Upon choosing that the user does have an account, the platform may direct a user to a user login module 706 (alternatively: screen, display, and/or page). The user login module may comprise a plurality of identification criteria. The plurality of identification criteria may comprise at least one of the plurality of user input requests. The plurality of identification criteria may be used to prompt the user to enter at least one input to securely log in. Upon logging in and/or a login confirmation, the platform may prompt the user to provide a current address in step 708. The current address may utilize a system to verify the validity of the address. Upon confirmation of the validity of the current address, the user may be directed to a home screen 710. Home Screen 710 may provide a default address in step 712.

Upon choosing that the user does not have an account, the platform may direct the user to an account creation interface and/or registration page 714. In some embodiments, the account creation interface may comprise a plurality of user input requests. The plurality of user input requests may comprise at least one of the following: a name, a biometric identification, a username, a user image, an age, a location, a date of birth, an email address, a password, a 2-step verification, an identity verification, a human verification, and an identification card scan. In some embodiments, the plurality of user input requests may be automatically filled via approval of at least one third-party platform. The plurality of user input requests may be used for creating a user profile. In further embodiments, the account creation interface may comprise a questionnaire. The questionnaire may be used to assist in associating a user with a plurality of recommended restaurants.

Upon the creation of the account, a confirmation display 716 may be provided. The confirmation display may be used as a result of the user successfully completing the plurality of inputs and/or the questionnaire. In some embodiments, the confirmation display may cause platform 100 to send a confirmation link. The confirmation link may be provided via email, text message, and/or any other notification previously mentioned. The confirmation link may be used to associate the email address to the user. The confirmation link may be further used to verify identification of the user.

Upon the confirmation and/or verification, the platform may direct the user to home screen 710.

The home screen may provide a user access to at least one of the following:
  a) a user profile module 718;
  b) a sharing option 720;
  c) a favorites module 722;
  d) a listing of available restaurants 724;
  e) a cuisine-type filtering option 726;
  f) an order module 728; and
  g) an order tracking module 730.

Figure 8:
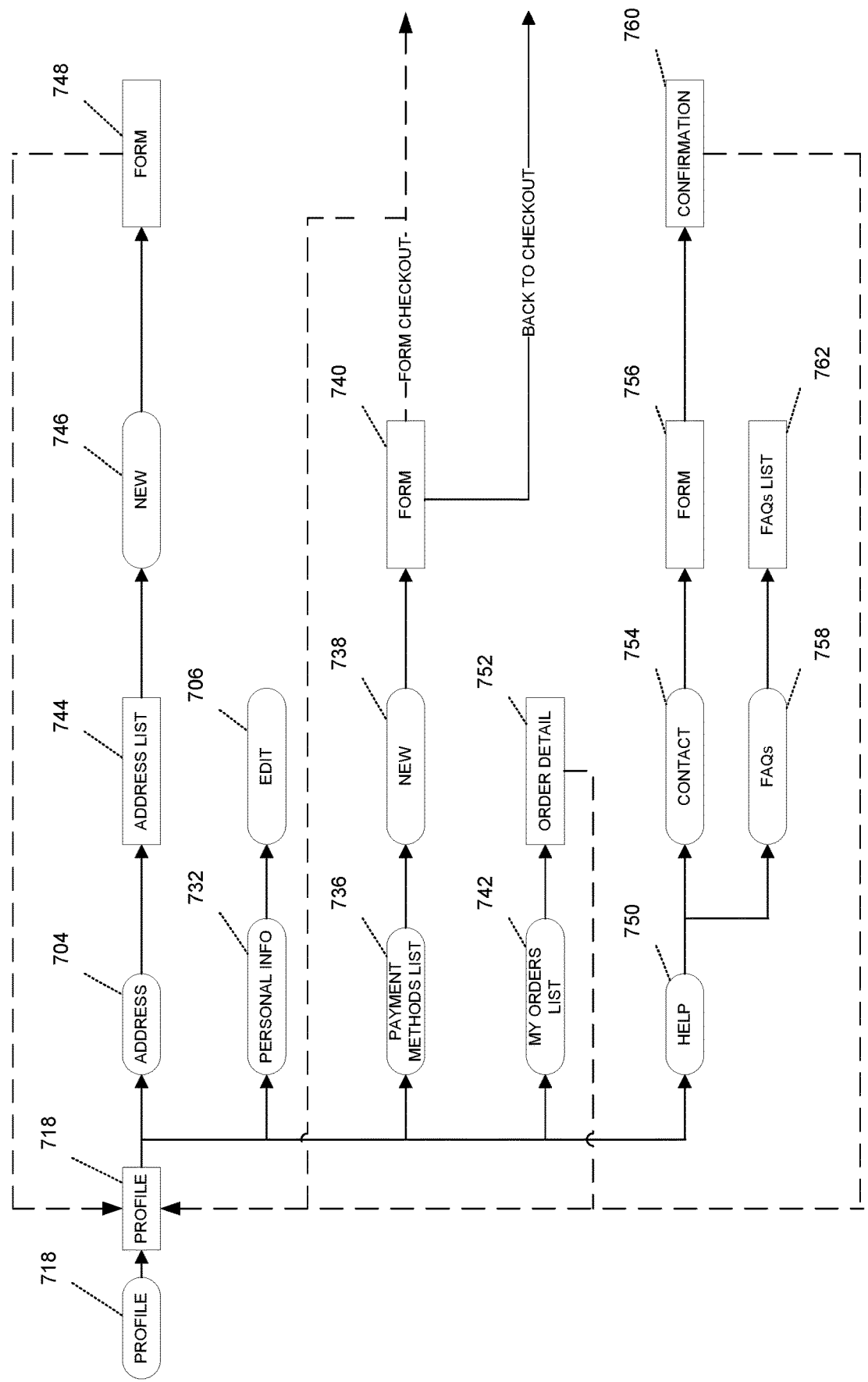
FIG. 8 illustrates a flow chart for a user profile module according to an embodiment of the present disclosure.

User profile module 718, as illustrated in FIG. 8, may comprise a plurality of user information 732. Plurality of user information 732 may be used to store, access, display, and/or modify the information provided from the plurality of user input requests and/or information comprised in the user login module.

User profile module 718 may provide an editing option 734 for personal user information 732.

User profile module 718 may further provide a payment methods list 736.

Payment methods list 736 may comprise a new payment option 738. The new payment option may prompt a user to fill out a virtual payment form 740 which, upon completion, adds the new payment to payment methods list 736.

User profile module 718 may further provide an orders list 742. Order list 742 may comprise order details 752 of a current multi-restaurant order and/or details of previous multi-restaurant orders.

The user profile module my further provide an address list 744. The address list may comprise a new address option 746. New address option 746 may prompt a user to fill out a virtual address form 748 which, upon completion, adds the new address to address list 744.

User profile module 718 may further provide a help menu 750. Help menu 750 may comprise a plurality of contact information 754. Plurality of contact information 754 may comprise a means to contact platform 100 associates, the plurality of restaurants, and/or those associated with the delivery of the plurality of order items. The means to contact may comprise a communication virtual fillable form and/or document 756. Upon completing a communication virtual fillable form and/or document 756, the user may receive a confirmation notification 760. Help menu 750 may further comprise a Frequently Asked Questions ("FAQ") page 758. FAQ page 758 may comprise a list of FAQs 762 relating to platform 100.

Figure 9:
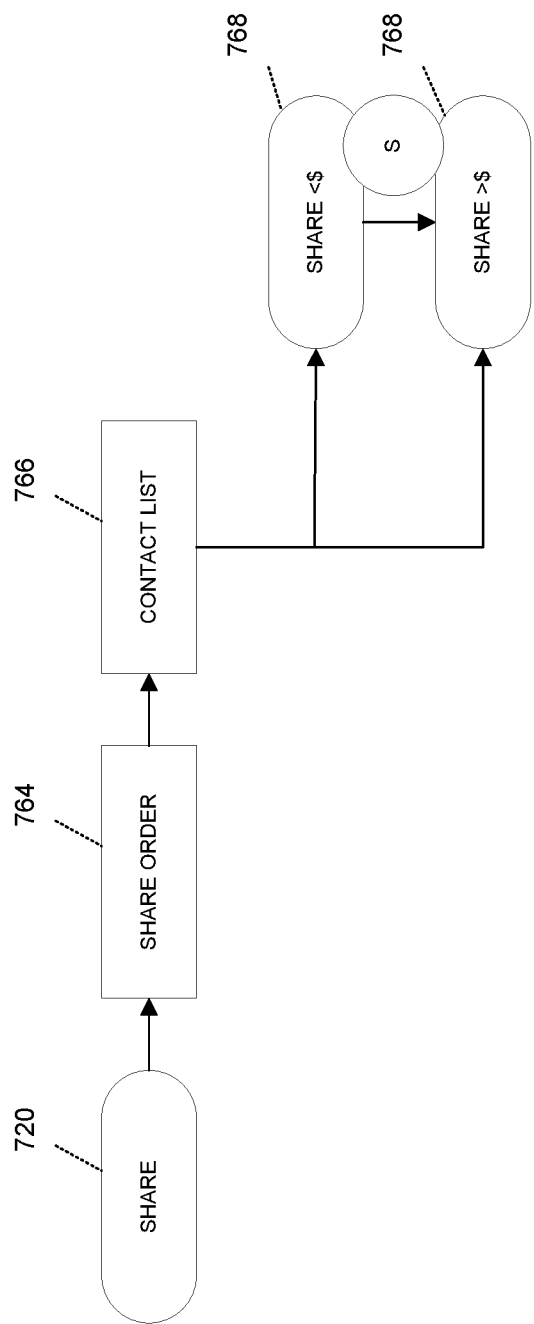
FIG. 9 illustrates a flow chart for a sharing option according to an embodiment of the present disclosure.

The sharing option 720, as illustrated in FIG. 9, may provide the user with a share order selection 764. Share order selection 764 may comprise access to a contact list 766 of the user. Contact list 766 may comprise contact information of a plurality of other users associated with the user, and/or contact information comprised in a device of the user. Sharing option 720 may further allow the user to request and/or contribute, as shown in 768, a selected amount of money to the multi-restaurant request and/or multi-restaurant order. Sharing option 720 may be further used to invite at least one other user to join the multi-restaurant order.

Figure 10A:
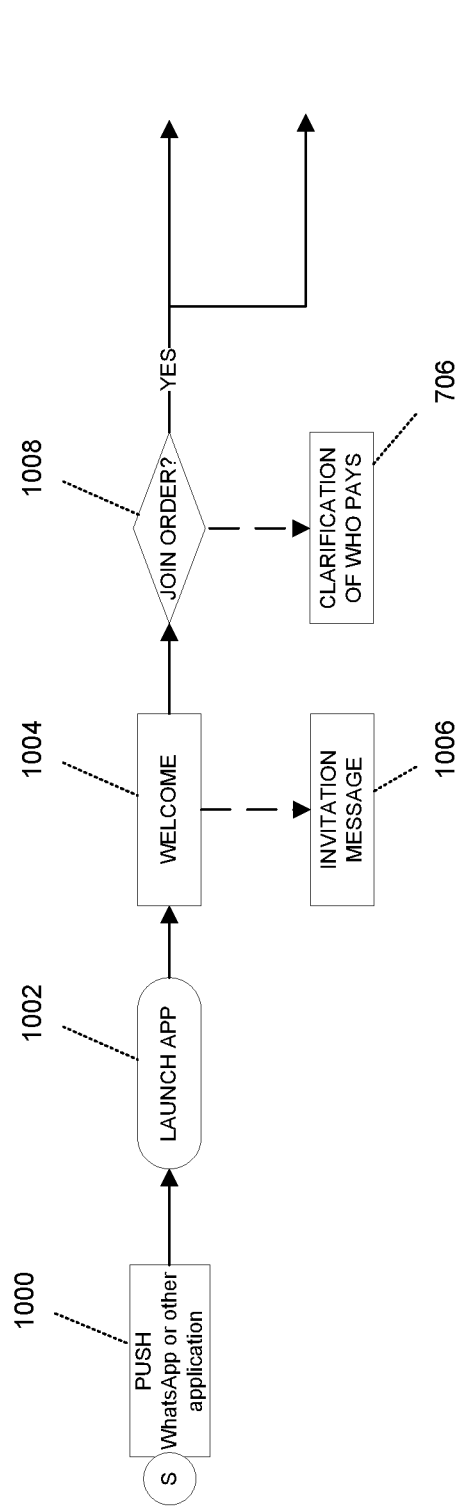
FIG. 10A illustrates a flow chart for launching platform 100 according to an embodiment of the present disclosure.

Inviting other users to join the multi-restaurant order, as illustrated in FIG. 10A, may be sent via a plurality of notifications types. It is noted that the plurality of notification types may be used at any stage and/or process of platform 100. The plurality of notification types may comprise at least one push notification 1000. Push notification 1000 may be used to display a notification as a text message sent to at least one other user. In further embodiments, the plurality of notification types may comprise a banner. The banner may be used display a notification for a short time on the screen and disappear after. In yet further embodiments, the plurality of notification types may comprise an in-app alert. The in-app alert may be used to display a notification via pop up window on the platform and require action from the user to open or close the in-app alert. In still further embodiments, the plurality of notification types may comprise a badge. The badge may be used to display a notification via small circles located on the corner of the platform icon. In yet still further embodiments, the plurality of notification types may comprise an audible alert. The audible alert may be used to inform the at least one other user of a notification.

The plurality of notifications may comprise a link and/or hyperlink. Selecting the link and/or hyperlink, as illustrated at stage 1002 may prompt platform 100 to launch and/or be activated on the device of the at least one user. Upon the platform launching via the at least one user selecting at least one of the notification types, the user may be directed to a welcome screen and/or page 1004. Welcome screen and/or page 1004 may comprise an invitation message 1006. Invitation message 1006 may be a customized message from the user and/or a prepopulated message. Welcome screen and/or page 1004 may further comprise a join order option 1008 to join the multi-restaurant order.

Figure 10B:
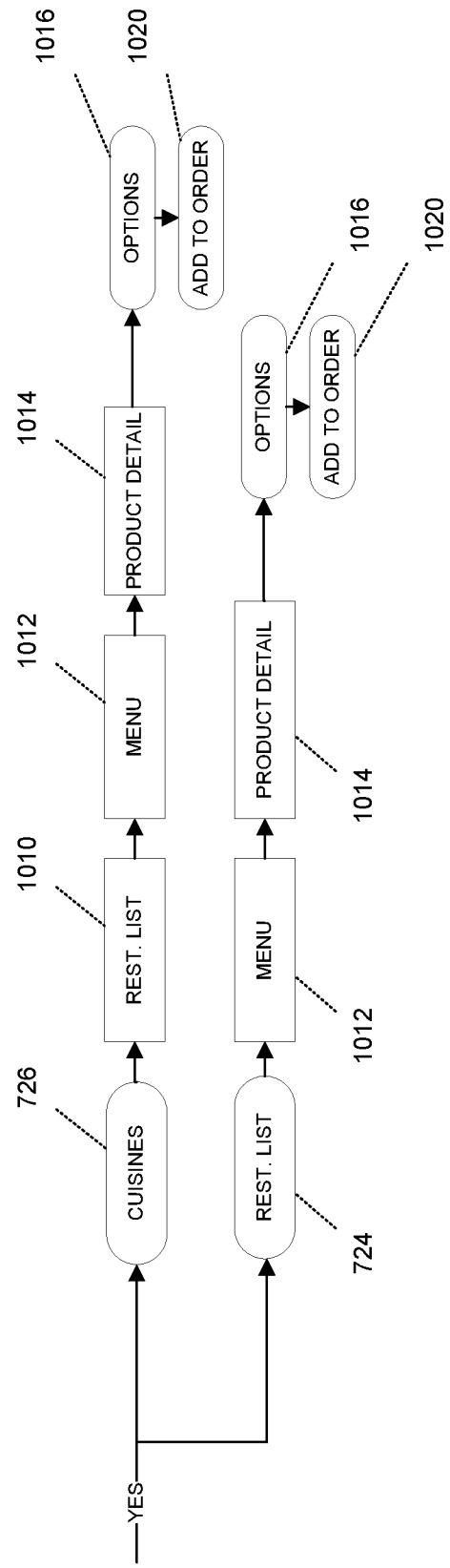
FIG. 10B illustrates a flow chart for adding at least one food item to the multi-restaurant order according to an embodiment of the present disclosure.

Upon joining the order, the user (may include the at least one user and any other users joining the order), as illustrated in FIG. 10B, may be presented with cuisine-type filtering option 726. Upon choosing one of the plurality of cuisines, a plurality of restaurants, specific to the selected cuisine may be presented as illustrated in 1010. Upon selecting a restaurant, a menu 1012 of a restaurant may be presented to the user. Upon choosing at least one product and/or order item from the menu, the at least one product and/or order item detail 1014 may be presented to the user. Platform 100 may allow the user to select various options and/or customizations 1016 for the product and/or order item. The user may then use an add to order option 1020 to select the at least one product and/or order item to be added to the multi-restaurant order.

The user may alternatively, upon joining the multi-restaurant order, view a listing of available restaurants 724 without being filtered by cuisine type, as illustrated in FIG. 10B. Upon selecting a restaurant, menu 1012 of the restaurant may be presented to the user. Upon choosing at least one product and/or order item from menu 1012, the at least one product and/or order item detail 1014 may be presented to the user. Platform 100 may allow the user to select various options and/or customizations 1016 for the product and/or order item. The user may then use an add to order option 1020 to select the at least one product and/or order item to be added to the multi-restaurant order.

Figure 11:
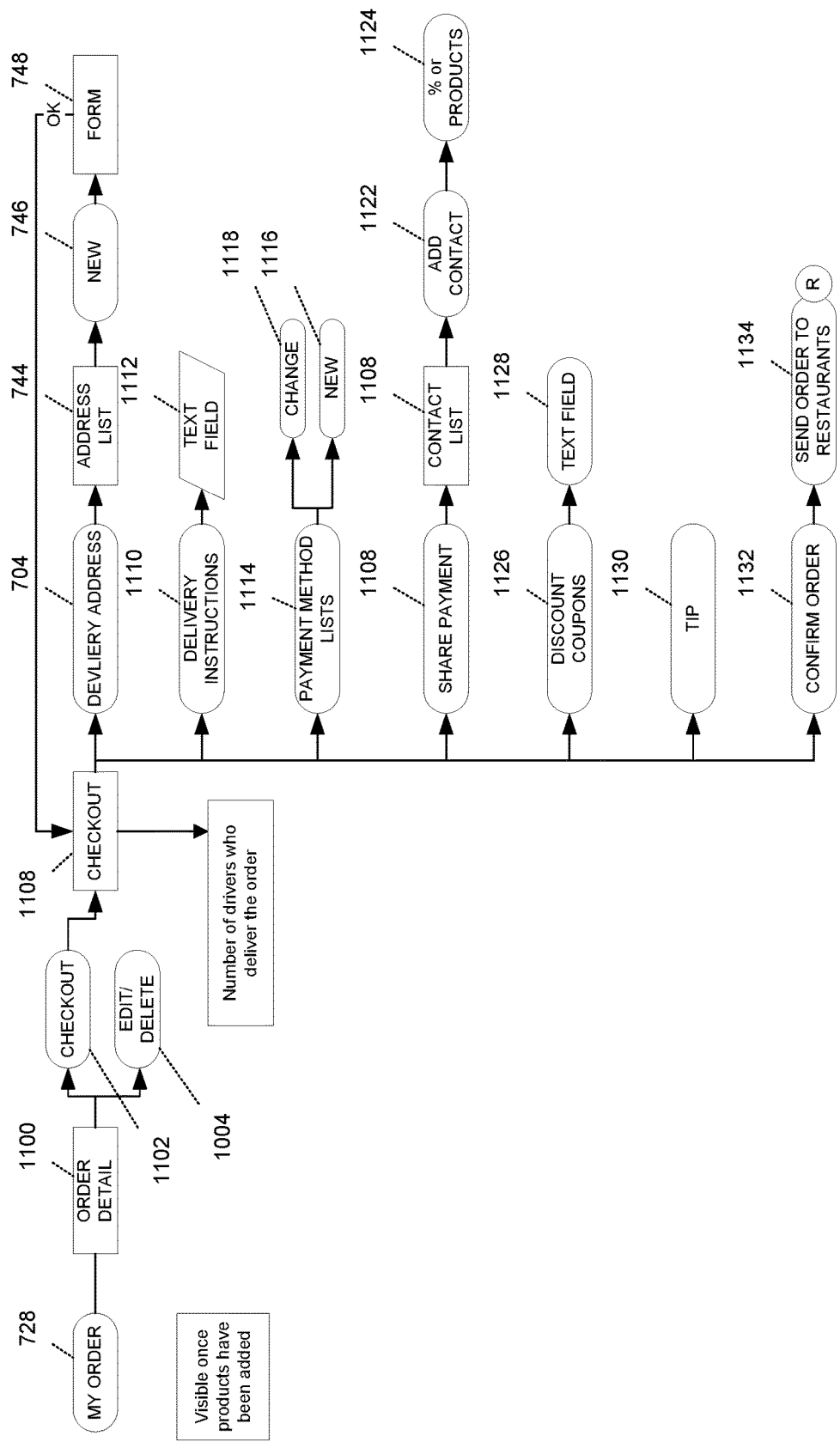
FIG. 11 illustrates a flow chart for a user completing a multi-restaurant order according to an embodiment of the present disclosure.

The selected products and/or food options may populate on order module 728, as illustrated in FIG. 11. Order module 728 may comprise an order detail module 1100 wherein the selected products and/or order items are aggregated, itemized, and/or displayed. Order detail module 1100 may comprise a checkout option 1102. Order detail module 1100 may further comprise and edit/delete option 1004. Edit/delete option 1004 may allow the user to add and/or delete selected products and/or order items from the multi-restaurant order. Order module 728 may be embodied as, for example, a virtual shopping cart. Upon concluding the selection of the desired products and/or order items, a checkout option 1102 may be selected. Upon selecting checkout option 1102, platform 100 may then direct the user to a checkout module 1108. Checkout module 1108 and/or order module 728 may allow for the time preference of delivery of each of the products and/or order items.

Figure 12:
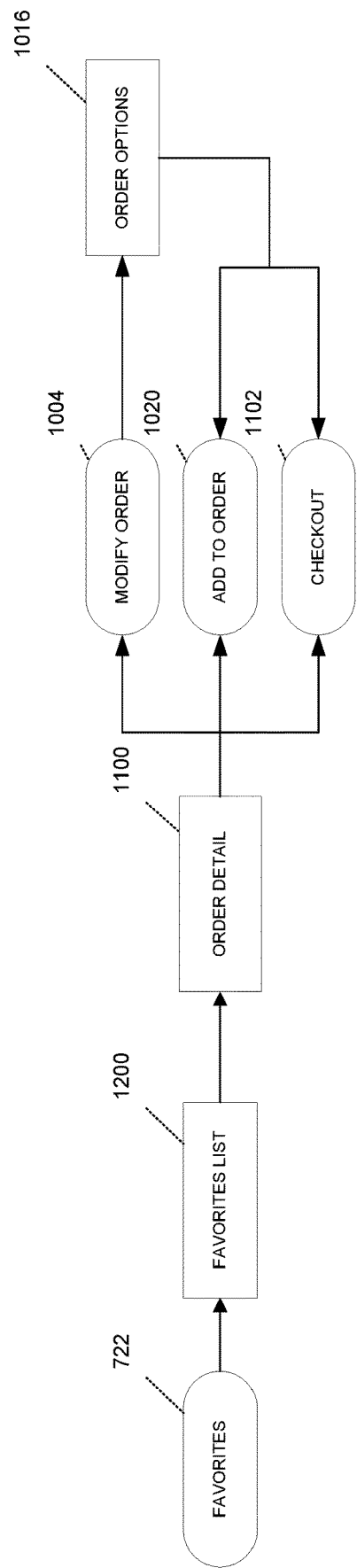
FIG. 12 illustrates a flow chart for a favorites module according to an embodiment of the present disclosure.

The favorites module 722, as illustrated in FIG. 12, may comprise a favorites list 1200 of bookmarked and/or favorited order items, restaurants, and/or multi-restaurant orders. Upon the selection of a favorited multi-restaurant order, the user may modify the multi-restaurant order prior to proceeding to checkout module 1108.

Checkout module 1108 as illustrated in FIG. 11, may comprise profile information of each user associated with the multi-restaurant order such as, for example, delivery address 704. The checkout module, prior to confirming the multi-restaurant order, may request a confirmation, update, and/or selection of the delivery address 744. The checkout module may further comprise a request at least one delivery instruction 1100. At least one delivery instruction 1110 may comprise a predetermined selection of delivery instructions, and/or a text field 1112 for customized instructions.

Checkout module 1108 may further comprise a request for a payment type and/or preference ("Payment Methods List") 1114 of the user. The requested payment type, method, and/or preference may comprise at least one previously entered and/or stored payment type and/or method of the user. The user, as illustrated in 1118, may change the payment type and/or method of the user. The requested payment type, method, and/or preference may further comprise a new, previously not stored payment type and/or method 1116 of the user.

Checkout module 1108 may further comprise a share payment option 1120. Share payment option 1120 may provide a user the ability to prompt other users to provide a portion of the monetary amount due. Upon selecting share payment option 1120, platform 100 may then access contact list 766 of the user and/or the contact information of those participating in the multi-restaurant order. Selecting share payment option 1120 may further allow a user to manually input a new contact 1122. New contact 1122 may or may not be another user of platform 100. Once each user associated with the multi-restaurant order is added to the multi-restaurant order, the user may choose to divide the sharing of payment by percent and/or by itemized products and/or order items associated with the multi-restaurant order, as illustrated by 1124.

Checkout module 1108 may further comprise a discount coupon input 1126. The discount coupon input may comprise a discount coupon text field 1128. Discount coupon text field 1128 may be used by a user to input a discount code for the at least one of the product and/or order item in the multi-restaurant order.

Checkout module 1108 may further comprise a tip input 1130. Tip input 1130 may be used for the user to compensate at least one deliver provider and/or delivery driver. Tip input 1130 may comprise a tip input text field. The tip input text field may be used by a user to input the monetary amount to compensate the at least one deliver provider and/or delivery driver.

Checkout module 1108 may further comprise an order confirmation option 1132. Upon the user selecting the order confirmation option, the multi-restaurant order may be transmitted to the plurality of restaurants associated with the multi-restaurant order, as illustrated in 1134. Upon the user selecting the order confirmation option, platform 100 may provide the user with a user map. The user map may comprise a virtual mapping display. The map may further comprise a geolocation identification of the delivery provider and/or the user overlayed on the virtual mapping display.

Figure 13:
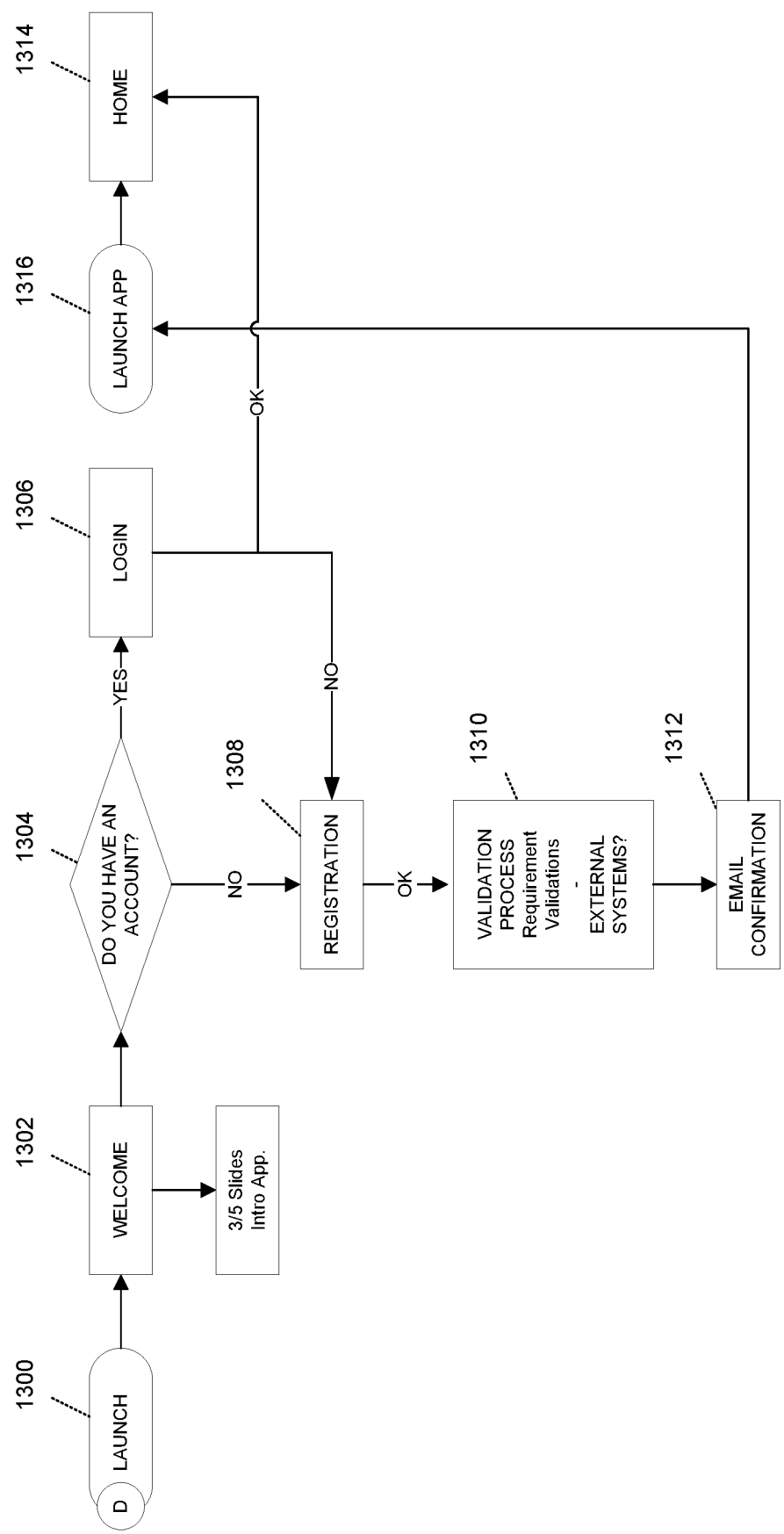
FIG. 13 illustrates a flow chart for a delivery provider accessing platform 100.

FIG. 13 illustrates a process for a delivery provider, a delivery coordinator, and/or delivery driver registration (collectively "delivery provider"). The registration may begin by the delivery provider launching platform 100, as illustrated in 1300. Upon launching platform 100, the delivery provider may be directed to a delivery provider welcome screen and/or page 1302. Delivery provider welcome screen and/or page 1302 may comprise a prompt to choose whether the delivery provider has an account or not, as illustrated in 1304.

Upon choosing that the delivery provider does have an account, the platform may direct a user to a delivery provider login module (alternatively: screen, display, and/or page) 1306. Delivery provider login module 1306 may comprise a plurality of identification criteria. The plurality of identification criteria may comprise at least one of the plurality of delivery provider input requests. The plurality of identification criteria may be used to prompt the delivery provider to enter at least one input to securely log in. Upon logging in and/or a login confirmation, the platform may prompt the delivery provider to provide a current address and/or location. The current address and/or location may utilize a system to verify the validity of the address. Upon confirmation of the validity of the current address, the delivery provider may be directed to a home screen. The platform may further prompt the delivery provider to provide an acceptance to have their geolocation tracked when associated with a multi-restaurant order and/or when platform 100 is running.

Upon choosing that the delivery provider does not have an account, the platform may direct the delivery provider to a delivery provider account creation interface and/or registration page 1308. In some embodiments, delivery provider account creation interface 1308 may comprise a plurality of delivery provider input requests and/or validation requests 1310. Plurality of user input requests and/or validation requests 1310 may comprise at least one of the following: a name, a biometric identification, a username, a user image, an age, a location, a date of birth, an email address, a password, a 2-step verification, an identity verification, a human verification, and an identification card scan. In some embodiments, the plurality of user input requests may be automatically filled and/or verified via approval of at least one third-party platform. The plurality of delivery provider input requests may be used for creating a delivery provider profile. In further embodiments, the account creation interface may comprise a questionnaire. The questionnaire may be used to gather information about the delivery provider such as, but not limited to, the following:

a) a vehicle type;

b) a food accommodation ability; and c) financial information.

Upon the creation of the account, a confirmation display 1312 may be provided. Confirmation display 1312 may be used as a result of the user successfully completing the plurality of inputs and/or the questionnaire. In some embodiments, confirmation display 1312 may cause platform 100 to send a confirmation link to the delivery provider. The confirmation link may be provided via email, text message, and/or any other notification previously mentioned. The confirmation link may be used to associate the email address to the user. The confirmation link may be further used to verify identification of the user.

Upon the confirmation and/or verification, the platform may direct and/or launch, as illustrated in 1316, the delivery provider to a delivery provider home screen and/or page 1314.

Figure 14A:
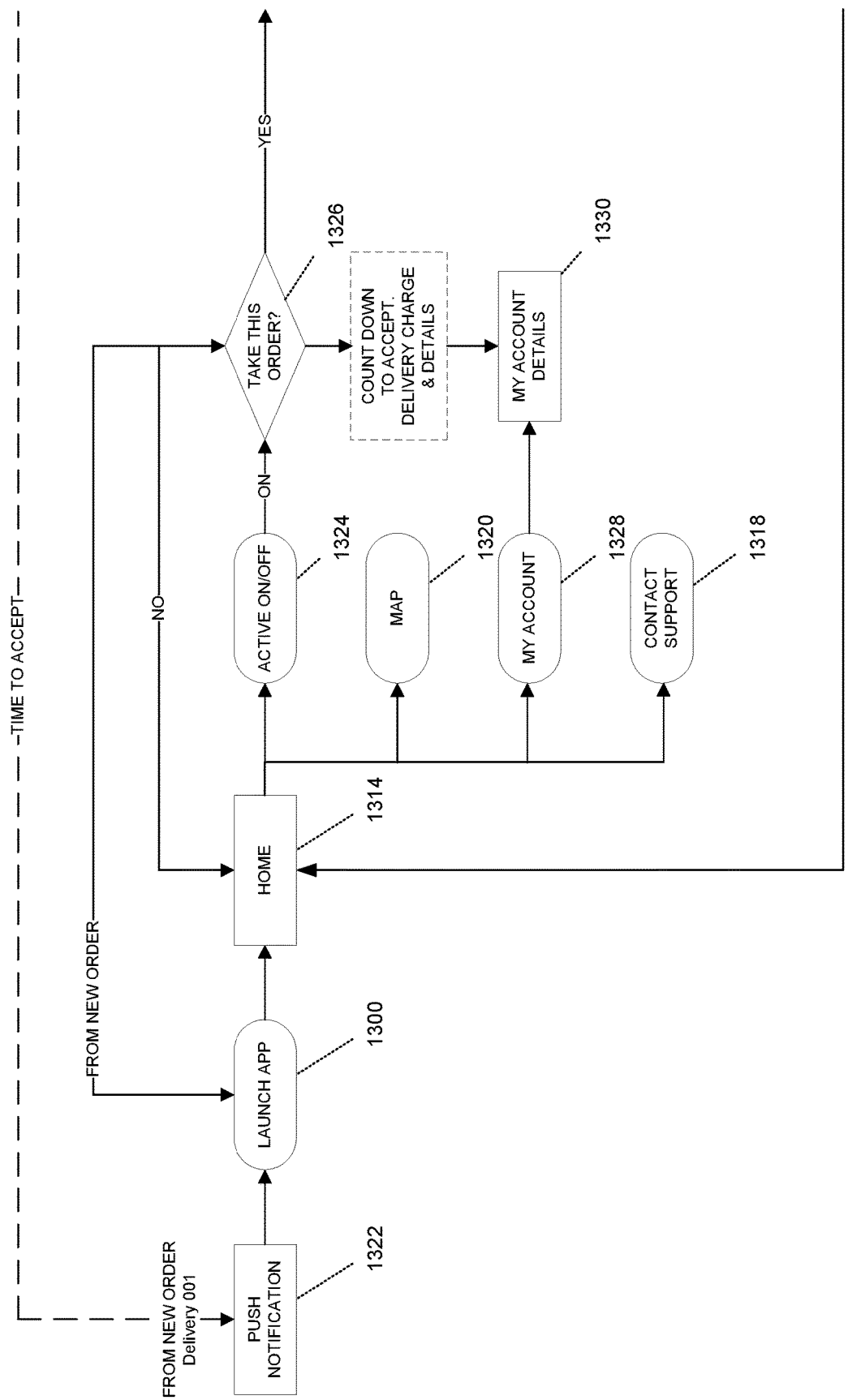
FIG. 14A illustrates a flow chart coordinating and delivering the multi-restaurant order once the multi-restaurant order has been requested and/or confirmed according to an embodiment of the present disclosure.
Figure 14B:
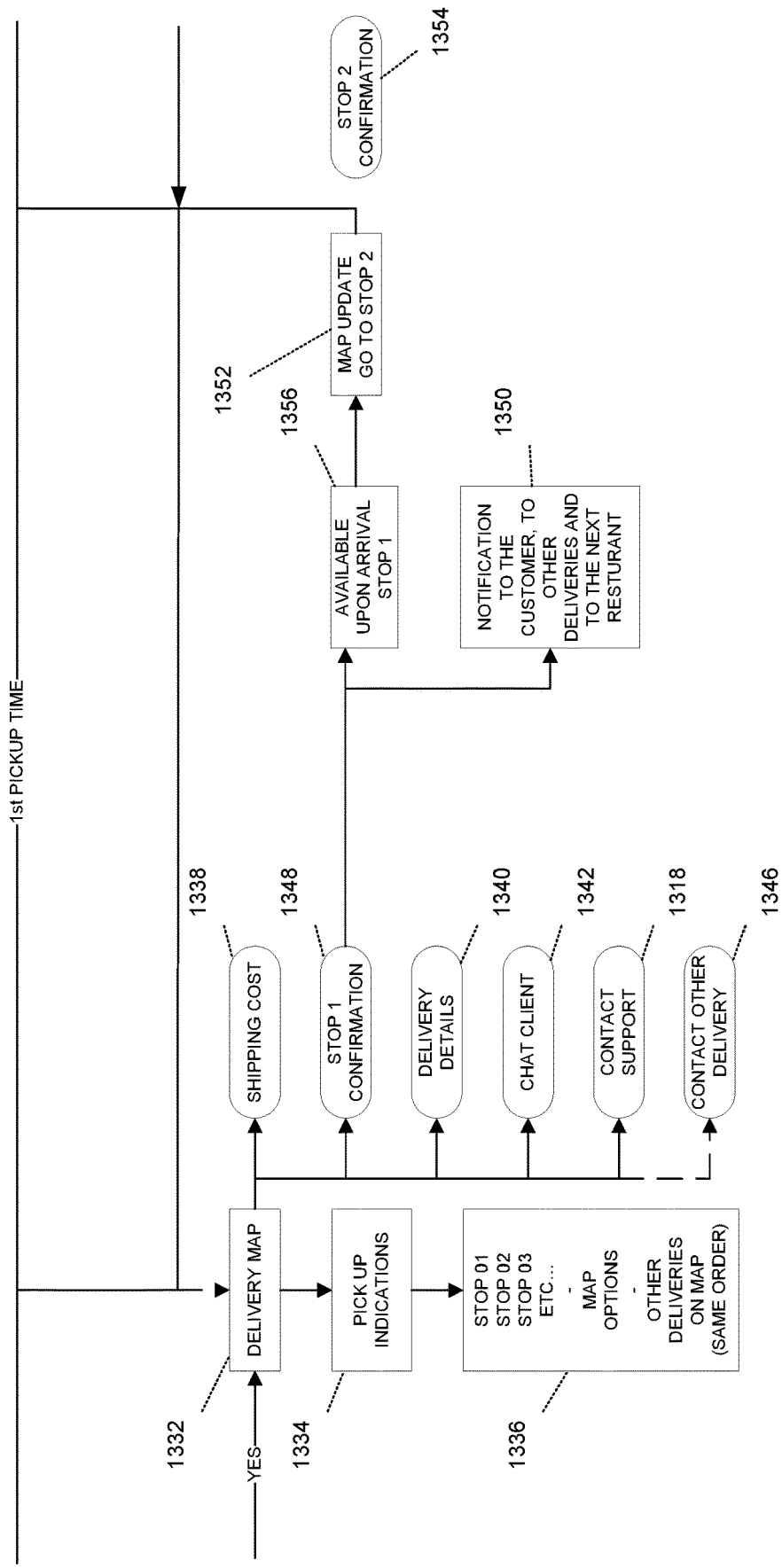
FIG. 14B illustrates a flow chart coordinating and delivering the multi-restaurant order once the multi-restaurant order has been requested and/or confirmed according to an embodiment of the present disclosure.
Figure 14C:
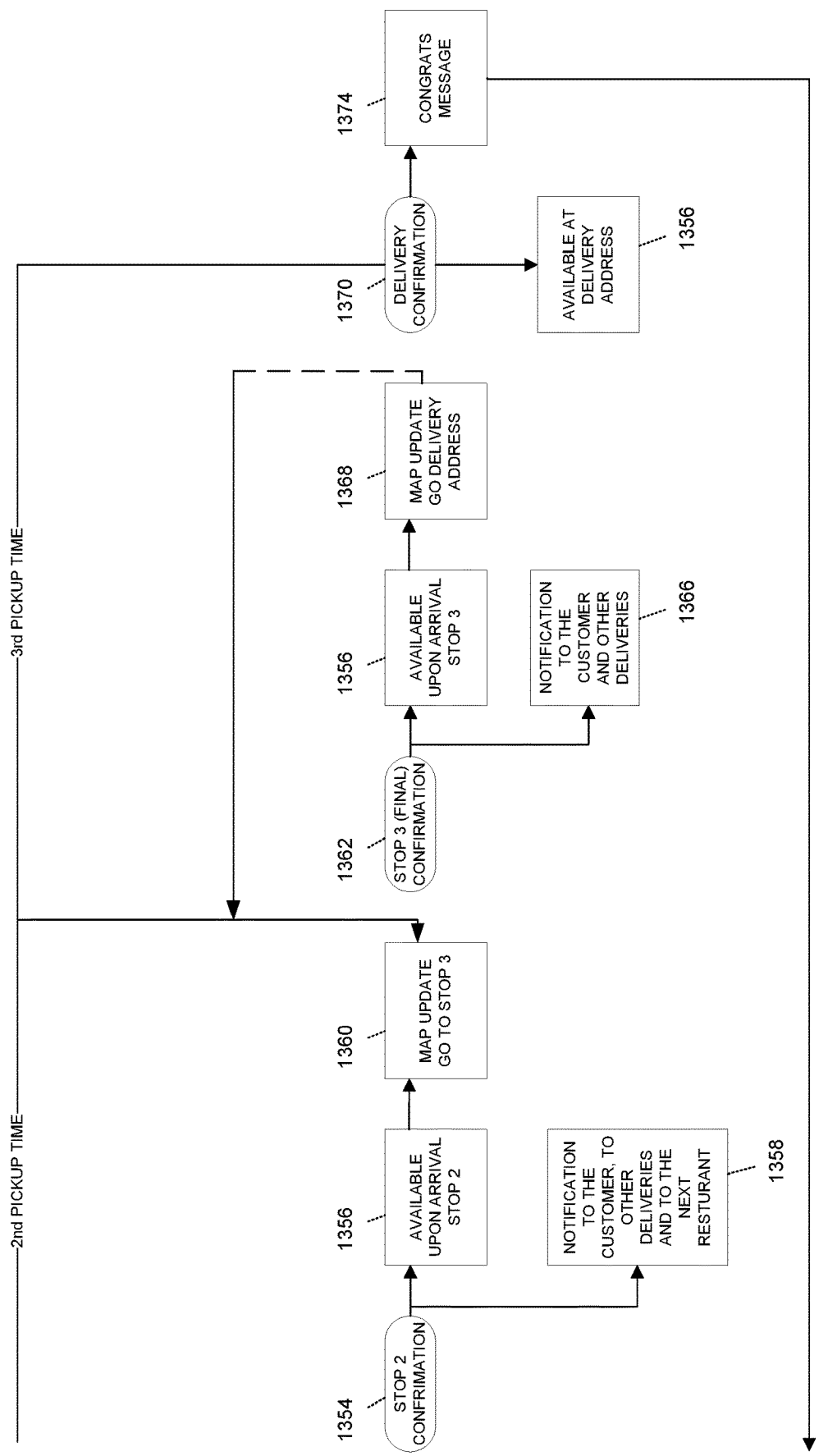
FIG. 14C illustrates a flow chart coordinating and delivering the multi-restaurant order once the multi-restaurant order has been requested and/or confirmed according to an embodiment of the present disclosure.

Delivery provider home screen and/or page 1314, as illustrated in FIGS. 14A and 14B, may comprise a delivery provider account module 1328. The delivery provider profile module may comprise a plurality of delivery provider information 1330. The plurality of delivery provider information may be used to store, access, display, and/or modify the information provided from the plurality of delivery provider input requests and/or information comprised in the delivery provider login module.

The profile module may provide an editing option for personal information.

The profile module may further provide a means for payment list. The means for payment list may comprise a new payment receiving option. The new payment receiving option may prompt a delivery provider to fill out a virtual payment receiving form which, upon completion, adds the new means of payment to the means for payment list.

The delivery provider profile module my further provide a contact support menu 1318. Contact support menu 1318 may comprise a plurality of contact information. The plurality of contact information may comprise a means to contact platform 100 associates, the plurality of restaurants, and/or users associated with the multi-restaurant order. The means to contact may comprise a virtual fillable form and/or document.

The delivery provider home screen and/or page, as further illustrated in FIG. 13, may comprise a map 1320. Map 1320 may comprise a virtual mapping display. The map may further comprise a geolocation identification of the delivery provider overlayed on the virtual mapping display.

The platform, as illustrated in FIGS. 14A and 14B, may comprise a number of steps and/or stages to coordinate and deliver the multi-restaurant order once the multi-restaurant order has been requested and/or confirmed. The process may start by providing a notification 1322 to a plurality of delivery providers. Notification 1322 may comprise any of the aforementioned notifications provided by platform 100. Notification 1322 may comprise a link and/or hyperlink. Selecting the link and/or hyperlink may prompt platform 100 to launch and/or be activated on the device of each of the plurality of delivery providers, as illustrated in 1300. Upon platform 100 launching via the at least one of the plurality of delivery providers selecting the notification, at least one of the plurality of delivery providers (collectively "delivery provider") may be directed to delivery provider home screen and/or page 1314.

Delivery provider home screen and/or page 1314 may comprise an option 1324 to be active on platform 100, or to be inactive on platform 100. Upon choosing to be active on platform 100, the delivery provider may be provided the option to accept or decline the multi-restaurant order. The option to accept or decline may be limited to a timeframe. If no choice is made within the given timeframe, platform may automatically decline the multi-restaurant order for the delivery provider. Prior to the accepting or declining, the delivery provider may be provided details of the multi-restaurant order.

Upon declining the multi-restaurant order, the delivery provider may be directed to the delivery provider home scree and/or page.

Upon accepting, the delivery provider may be provided with a delivery map 1332. The delivery map may comprise a plurality of pickup indications 1334. Plurality of pickup indications 1334 may comprise the geolocations of the plurality of restaurants associated with the multi-restaurant order overlayed on the map. Plurality of pickup indications 1334 may comprise an estimated timeframe 1336 for the at least one product and/or order item to be completed and/or to pick up the at least one product and/or order item from each of the plurality of restaurants associated with the multi-restaurant order. The delivery map may further provide the delivery provider a shipping and/or delivery cost 1338. Shipping and/or delivery cost 1338 may comprise an amount of funds received by the delivery provider and/or platform 100 after successfully delivering each of the order items to the user.

It is noted that at any point during the delivery process of the multi-restaurant order, the delivery provider may have access to at least one of the following:
a) a plurality of delivery details 1340 of the multi-restaurant order;
b) contact information and/or an ability to communicate with at least one user associated with the multi-restaurant order, as illustrated in 1342;
c) contact information and/or an ability to communicate with at least one associate of platform 100, as illustrated in 1318; and
d) contact information and/or an ability to communicate with at least one other delivery provider associated with the multi-restaurant order, as illustrated in 1346.

Upon accepting, the delivery provider may choose, indicate, associate, and/or confirm (collectively "confirm") which of the at least one product and/or order item to pick up, as illustrated in 1348. Upon the confirming, platform 100 may then send a notification 1350 to the user of at least one of the following:
a) profile information of the delivery provider;
b) an estimated time for pickup of the at least one product and/or order item;
c) an estimated time for delivery of the at least one product and/or order item; and
d) a geolocation of the delivery provider.

Upon the delivery provider completing the picking up of the at least one product and/or order item, platform 100 may transmit a notification informing pickup completion to the at least one of the following associated with the at least one multi-restaurant: the at least one user, the at least one restaurant, and/or other delivery providers. Upon the delivery provider arriving at the restaurant and/or stop, the delivery provider may update platform 100 with an availability 1356. Upon the delivery provider completing the picking up of the at least one product and/or order item, platform 100 may further update the delivery map as illustrated in step 1352 wherein the next destination is either to the location of the user and/or the location of the next restaurant associated with the multi-restaurant order.

The delivery provider may, upon confirming, proceed to the second restaurant and/or stop in the multi-restaurant order, as illustrated in step 1354. Upon the delivery provider completing the picking up of the at least one product and/or order item, platform 100 may transmit a notification 1358 informing pickup completion to the at least one of the following associated with the at least one multi-restaurant: the at least one user, the at least one restaurant, and/or other delivery providers. Upon the delivery provider arriving at the second restaurant and/or stop, the delivery provider may update platform 100 with an availability 1356. Upon the delivery provider completing the picking up of the at least one product and/or order item, platform 100 may further update the delivery map, as illustrated in 1360, wherein the next destination is either to the location of the user and/or the location of the next restaurant associated with the multi-restaurant order.

The delivery provider may, upon confirming, proceed to the third restaurant and/or stop in the multi-restaurant order, as illustrated in step 1362. Upon the delivery provider completing the picking up of the at least one product and/or order item, platform 100 may transmit a notification 1366 informing pickup completion to the at least one of the following associated with the at least one multi-restaurant: the at least one user, the at least one restaurant, and/or other delivery providers. Upon the delivery provider arriving at the third restaurant and/or stop, the delivery provider may update platform 100 with an availability 1364. Upon the delivery provider completing the picking up of the at least one product and/or order item, platform 100 may further update the delivery map, as illustrated in 1368, wherein the next destination is either to the location of the user and/or the location of the next restaurant associated with the multi-restaurant order.

The delivery provider may, for example, proceed to the further restaurants and/or stops in the multi-restaurant order. Upon the delivery provider completing the picking up of the at least one product and/or order item, platform 100 may transmit a notification informing pickup completion to the at least one of the following associated with the at least one multi-restaurant: the at least one user, the at least one restaurant, and/or other delivery providers. Upon the delivery provider completing the picking up of the at least one product and/or order item, platform 100 may further update the delivery map wherein the next destination is either to the location of the user and/or the location of the next restaurant associated with the multi-restaurant order.

Upon the delivery provider picking up the requested products and/or order items, the delivery provider may then deliver all or part of the multi-restaurant order to the user. Upon a successful delivery of the multi-restaurant order, the user and/or delivery provider may confirm the delivery on platform 100, as illustrated in step 1370. A congratulations message notification 1374 may be transmitted to the user and/or delivery provider upon the confirmation of delivery.

Figure 15A:
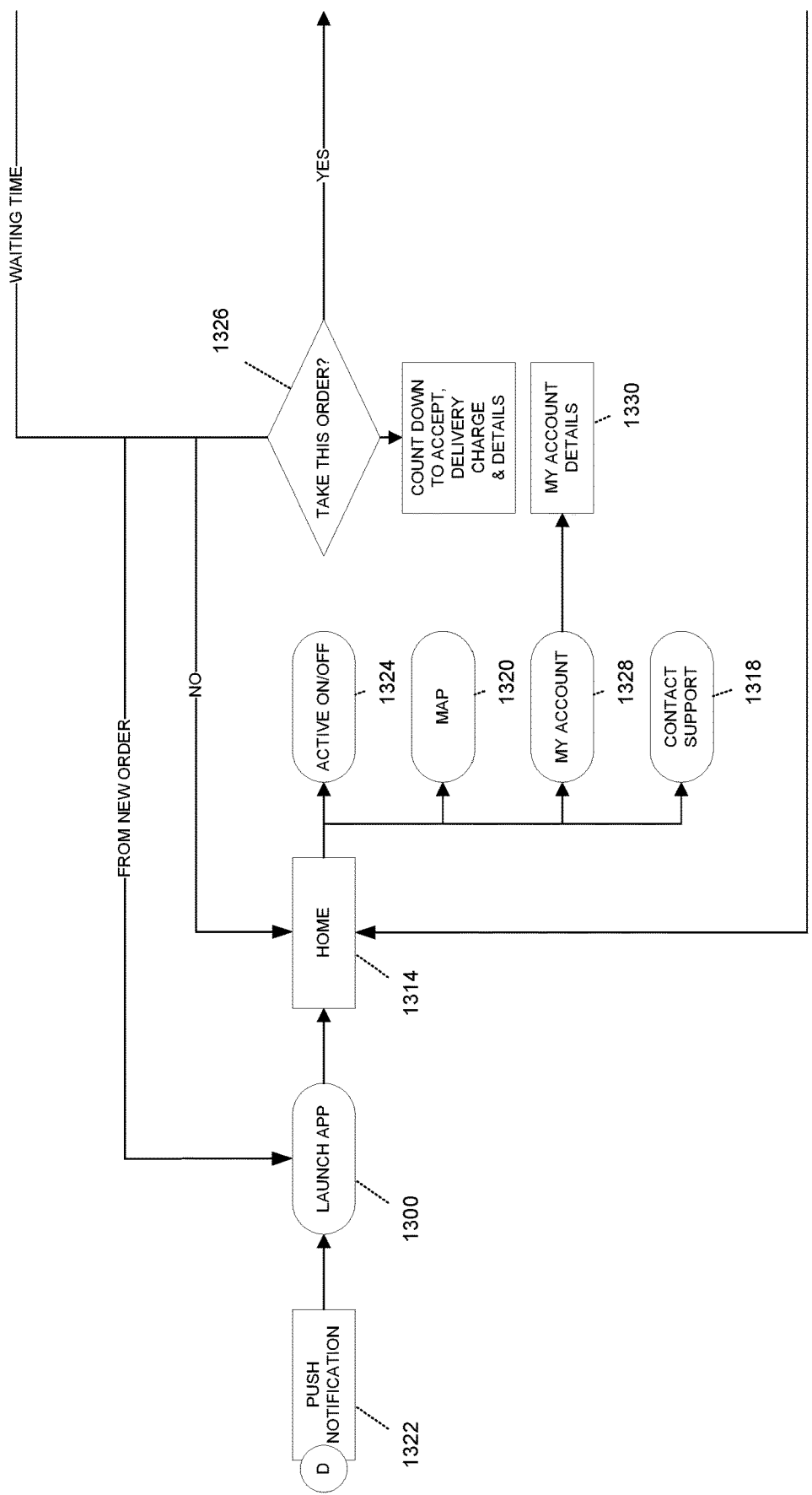
FIG. 15A illustrates a flow chart in which the delivery provider accepts at least one product and/or food item of the multi-restaurant request.
Figure 15B:
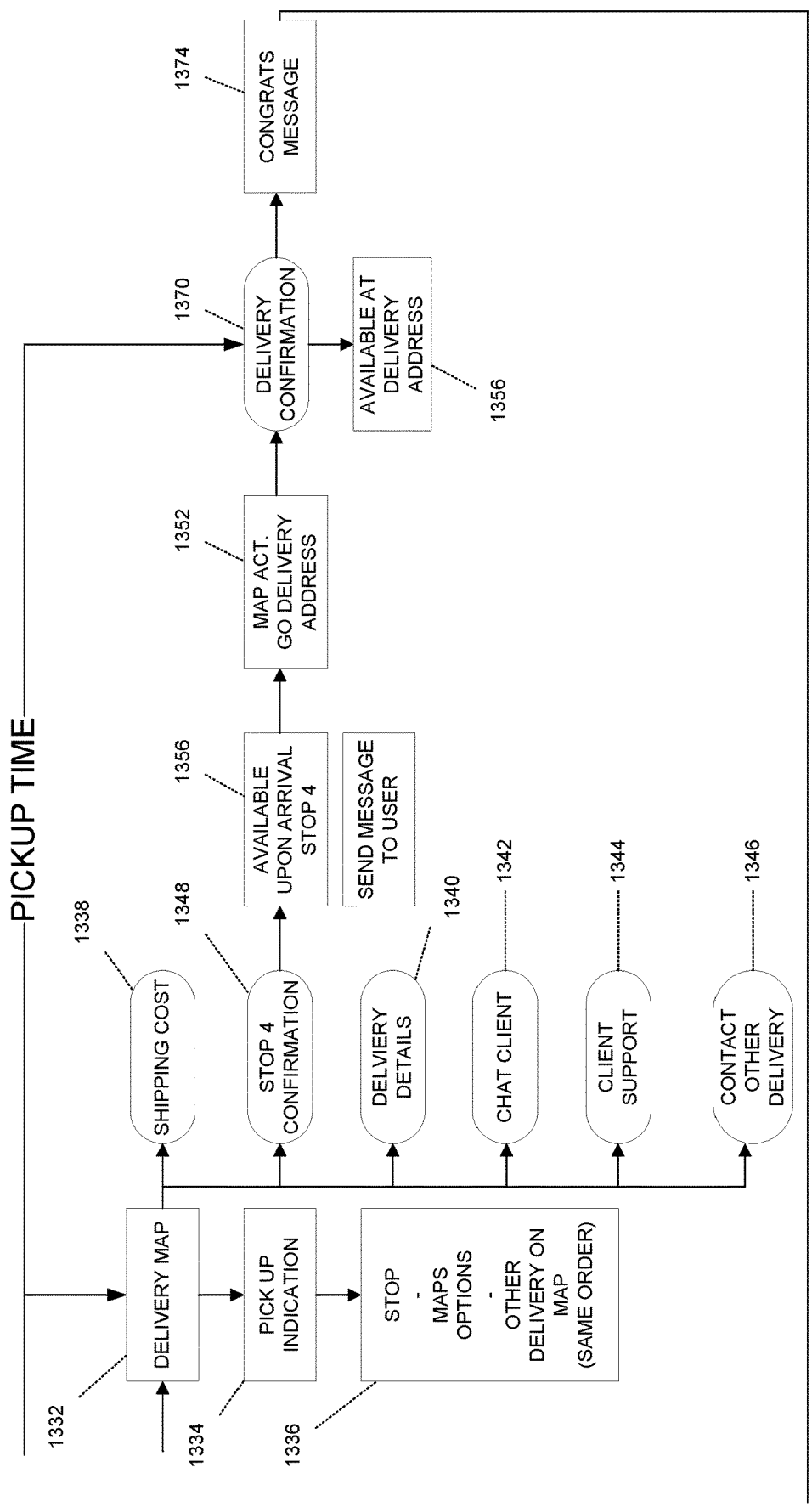
FIG. 15B illustrates a flow chart in which the delivery provider accepts at least one product and/or food item of the multi-restaurant request.

FIGS. 15A and 15B illustrates an embodiment in which the delivery provider accepts at least one product and/or order item of the multi-restaurant request, and the delivery provider is given a latency to wait to pick up the at least one product and/or order item. This latency in pick up may be caused by the restaurant having a wait time, the product and/or order item being required to be at a predetermined temperature upon delivery to the user, the product and/or order item being a subsequent "course" for the multi-restaurant order, and/or the product and/or order item having to be combined and/or delivered at the same time as the other products and/or order items in the multi-restaurant request.

Figure 16A:
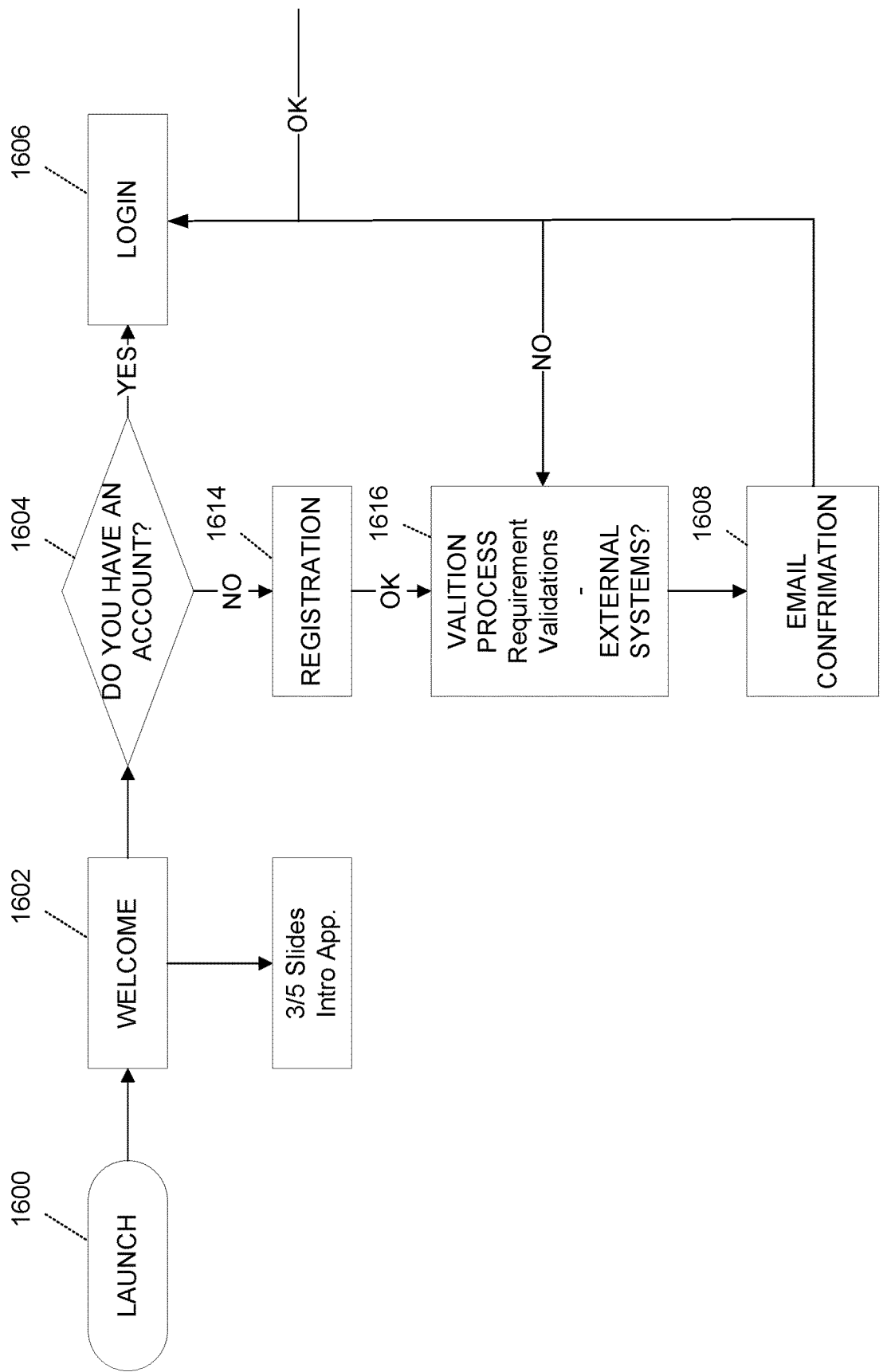
FIG. 16A illustrates a flow chart for a restaurant launching platform 100.

FIG. 16 illustrates a flow chart of a restaurant launching system or platform 100. Upon launching platform 100 at step 1600, the restaurant may be forwarded to a restaurant welcome screen and/or page 1602. Restaurant welcome screen and/or page 1602 may comprise a prompt 1604 to choose whether the user has an account or not.

Upon choosing that the user does have an account, the platform may direct a user to a restaurant login module 1606 (alternatively: screen, display, and/or page). The restaurant login module may comprise a plurality of identification criteria. The plurality of identification criteria may comprise at least one of the plurality of restaurant input requests. The plurality of identification criteria may be used to prompt the restaurant to enter at least one input to securely log in. Upon logging in and/or a login confirmation, the platform may prompt the restaurant to provide a current address in step 1608. The current address may utilize a system to verify the validity of the address. Upon confirmation of the validity of the current address, the restaurant may be directed to a restaurant home screen 1612. Restaurant home screen 1612 may provide a default address in step 712.

Upon choosing that the user does not have an account, the platform may direct the user to an account creation interface and/or registration page 1614. In some embodiments, the account creation interface may comprise a plurality of user input requests. The plurality of user input requests 1616 may comprise at least one of the following: a name, a biometric identification, a username, a user image, an age, a location, a date of birth, an email address, a password, a 2-step verification, an identity verification, a human verification, and an identification card scan. In some embodiments, the plurality of user input requests may be automatically filled via approval of at least one third-party platform. The plurality of user input requests may be used for creating a user profile. In further embodiments, the account creation interface may comprise a questionnaire. The questionnaire may be used to assist in associating a user with a plurality of recommended restaurants.

Upon the creation of the account, a confirmation display 1608 may be provided. The confirmation display may be used as a result of the user successfully completing the plurality of inputs and/or the questionnaire. In some embodiments, the confirmation display may cause platform 100 to send a confirmation link. The confirmation link may be provided via email, text message, and/or any other notification previously mentioned. The confirmation link may be used to associate the email address to the user. The confirmation link may be further used to verify identification of the user.

Upon the confirmation and/or verification, the platform may direct the restaurant to restaurant home screen 1612.

Figure 16B:
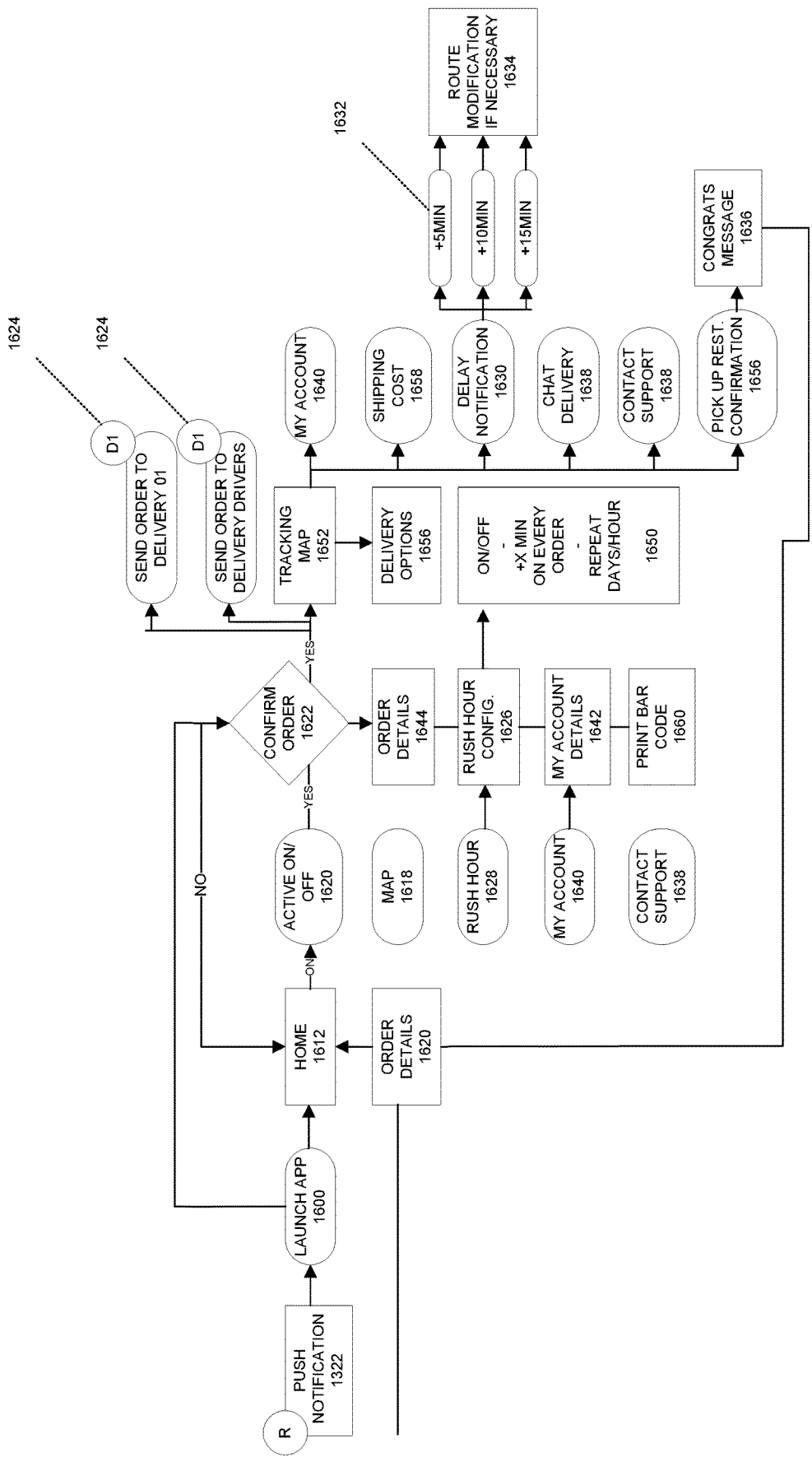
FIG. 16B illustrates a flow chart for a restaurant launching platform 100.

Restaurant home screen and/or page 1612, as illustrated in FIG. 16B, may comprise a restaurant profile module 1640. Restaurant profile module 1640 may comprise a plurality of restaurant information 1642. The plurality of restaurant information may be used to store, access, display, and/or modify the information provided from the plurality of restaurant input requests and/or information comprised in the restaurant login module.

The profile module may provide an editing option for personal information.

The profile module may further provide a means for payment list. The means for payment list may comprise a new payment receiving option. The new payment receiving option may prompt a restaurant to fill out a virtual payment receiving form which, upon completion, adds the new means of payment to the means for payment list.

The profile module may further provide a means for printing a bar code 1660.

The restaurant profile module may further provide a contact support menu 1638. Contact support menu 1638 may comprise a plurality of contact information. The plurality of contact information may comprise a means to contact platform 100 associates, the plurality of restaurants, and/or users associated with the multi-restaurant order. The means to contact may comprise a virtual fillable form and/or document.

Restaurant home screen and/or page 1612, as further illustrated in FIG. 16B, may comprise a map 1618. Map 1618 may comprise a virtual mapping display. Map 1618 may further comprise a geolocation identification of the restaurant overlayed on the virtual mapping display.

The restaurant home screen and/or page may comprise an option 1620 to be active on platform 100, or to be inactive on platform 100. Upon choosing to be active on platform 100, the restaurant may be provided the option 1622 to accept ("confirm") or decline the multi-restaurant order. The option to accept or decline may be limited to a timeframe. If no choice is made within the given timeframe, platform may automatically decline the multi-restaurant order for the restaurant. Prior to the accepting or declining, the restaurant may be provided details 1644 of the multi-restaurant order.

Upon confirming the order, the restaurant may be provided details of the multi-restaurant order. Upon confirming the order, the restaurant may send the order to the at least one delivery provider associated with the multi-restaurant order, as illustrated in step 1624.

Upon confirming the order, the restaurant may be provided a tracking map 1652. Tracking map 1654 may comprise the features of map 1618 in relation to the confirmed multi-restaurant order. Tracking map 1654 may further comprise delivery options 1656.

Upon confirming the order, the restaurant may determine and/or view a shipping cost 1658.

Upon confirming the order, the restaurant may comprise a rush hour configuration 1626. Rush hour configuration 1626 may comprise an estimation of time the restaurant will take to begin and/or prepare the at least one product and/or order item. The estimation may be based on a queue and/or priority of products and/or order items prior to the at least one product and/or order item of the multi-restaurant order. The rush hour configuration may occur during predetermined timeframes 1628 ("Rush Hour"). The rush hour configuration may modify the estimated pickup, preparation, and/or delivery time of the at least one product and/or order item and/or multi-restaurant order, as illustrated in step 1650. The restaurant may further transmit a delay notification 1630 in the event of any delay that occurs at in regard to the preparation of the at least one product and/or order item. Delay modification 1630 may be presented to the restaurant in the form of selectable options such as, for example, +5 min, +10 min, and +15 min, as illustrated in step 1632. If the delay in the preparation of the at least one product and/or order item is long enough, a route modification 1634 of the delivery provider may occur. The route modification may prompt a transmission of a notification of the delay to the delivery provider and/or the user.

Upon a successful pickup of the products and/or order items, the restaurant and/or delivery provider may confirm the pickup, as illustrated in step 1656 on platform 100. A congratulations message notification 1636 may be transmitted to the restaurant and/or delivery provider upon the confirmation of pickup.

Figure 17:
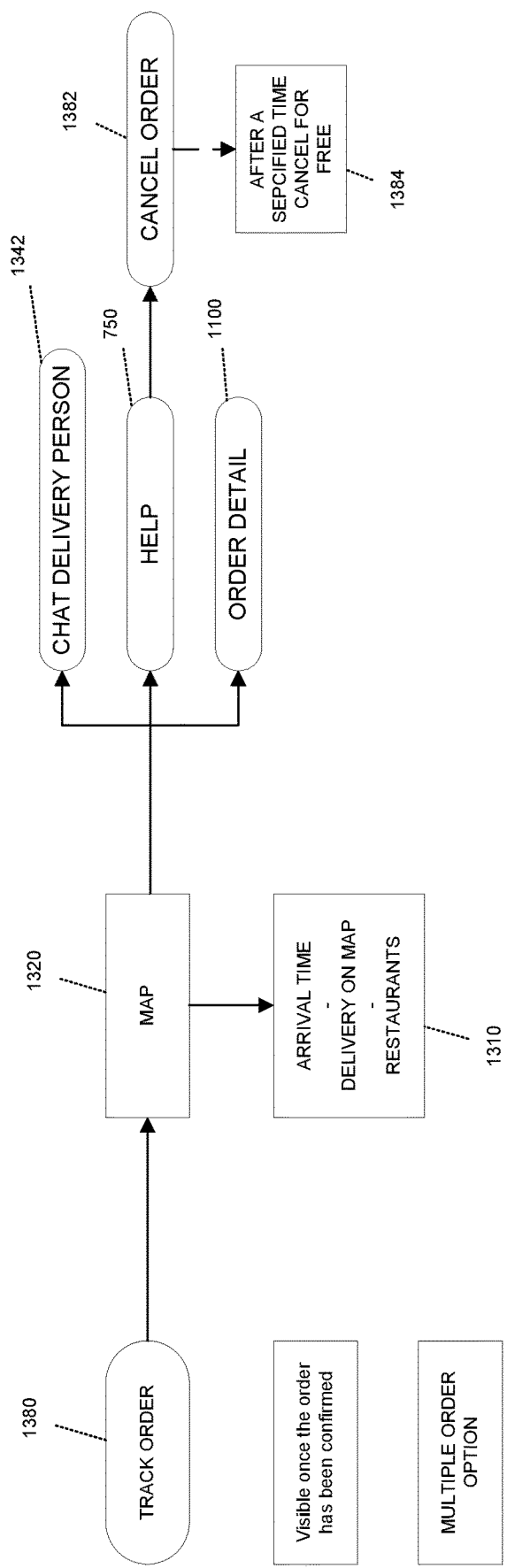
FIG. 17 illustrates a flow chart for additional options of the user after the confirmation of a multi-restaurant order.
Figure 18:
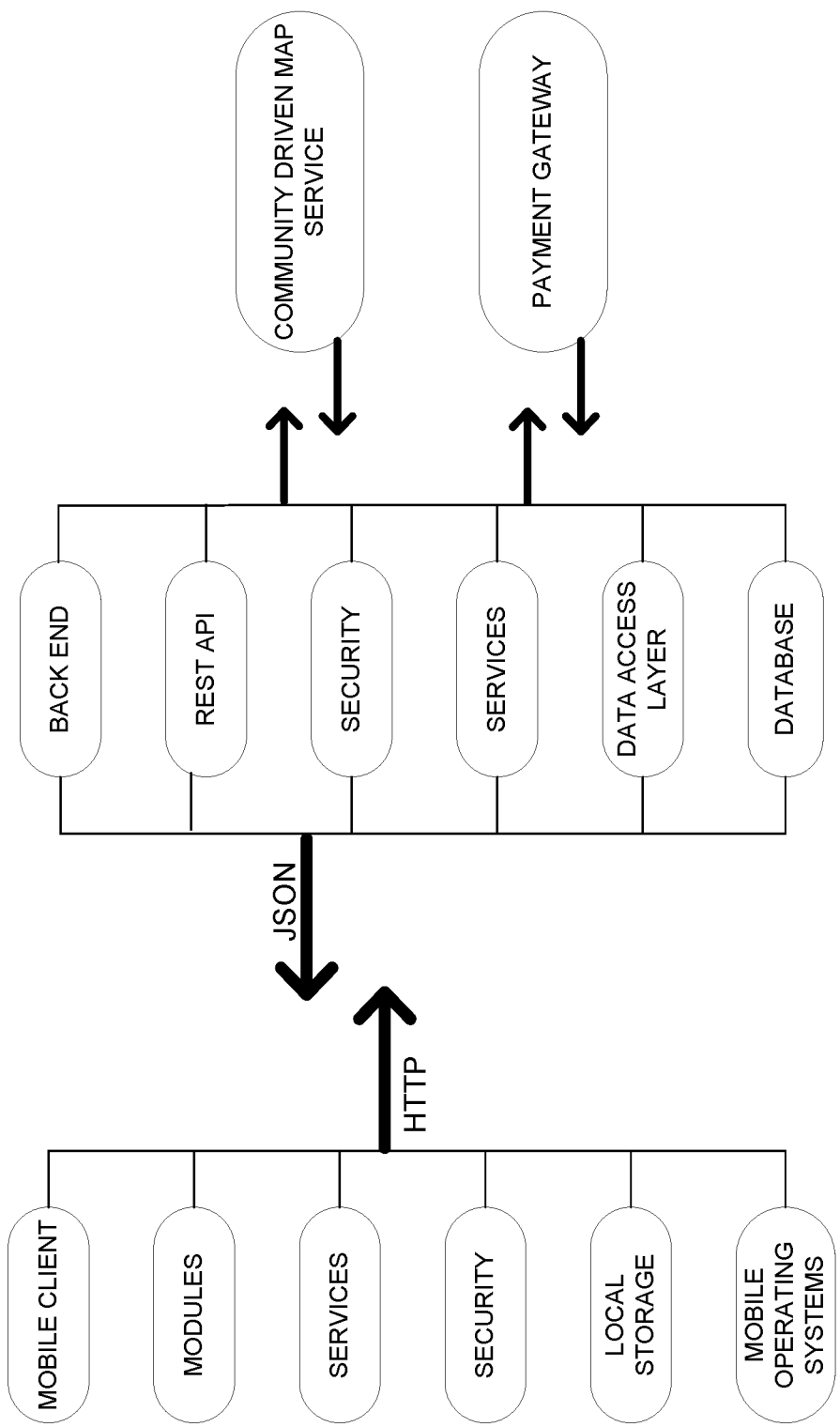
FIG. 18 illustrates a flow chart of communication between a mobile client of platform 100, the back end of platform 100, a payment gateway of platform 100, and/or a community driven map service of platform 100 according to an embodiment of the present disclosure.

FIG. 17 illustrates a flow chart of additional options of the user after the confirmation of a multi-restaurant order. Track order option 1380 may be made visible after the confirmation of a multi-restaurant order. Track order option 1380 may comprise map 1320. Map 1320 may comprise a chat delivery option 1342 wherein the user may contact the at least one delivery provider. Map 1320 may further comprise help option 750. Help option 750 may comprise a cancel order option 1382. Cancel order option 1382 may be configured to not charge the user if cancelled within a predetermined amount of time of placing the order, as illustrated in step 1384.

Figure 20:
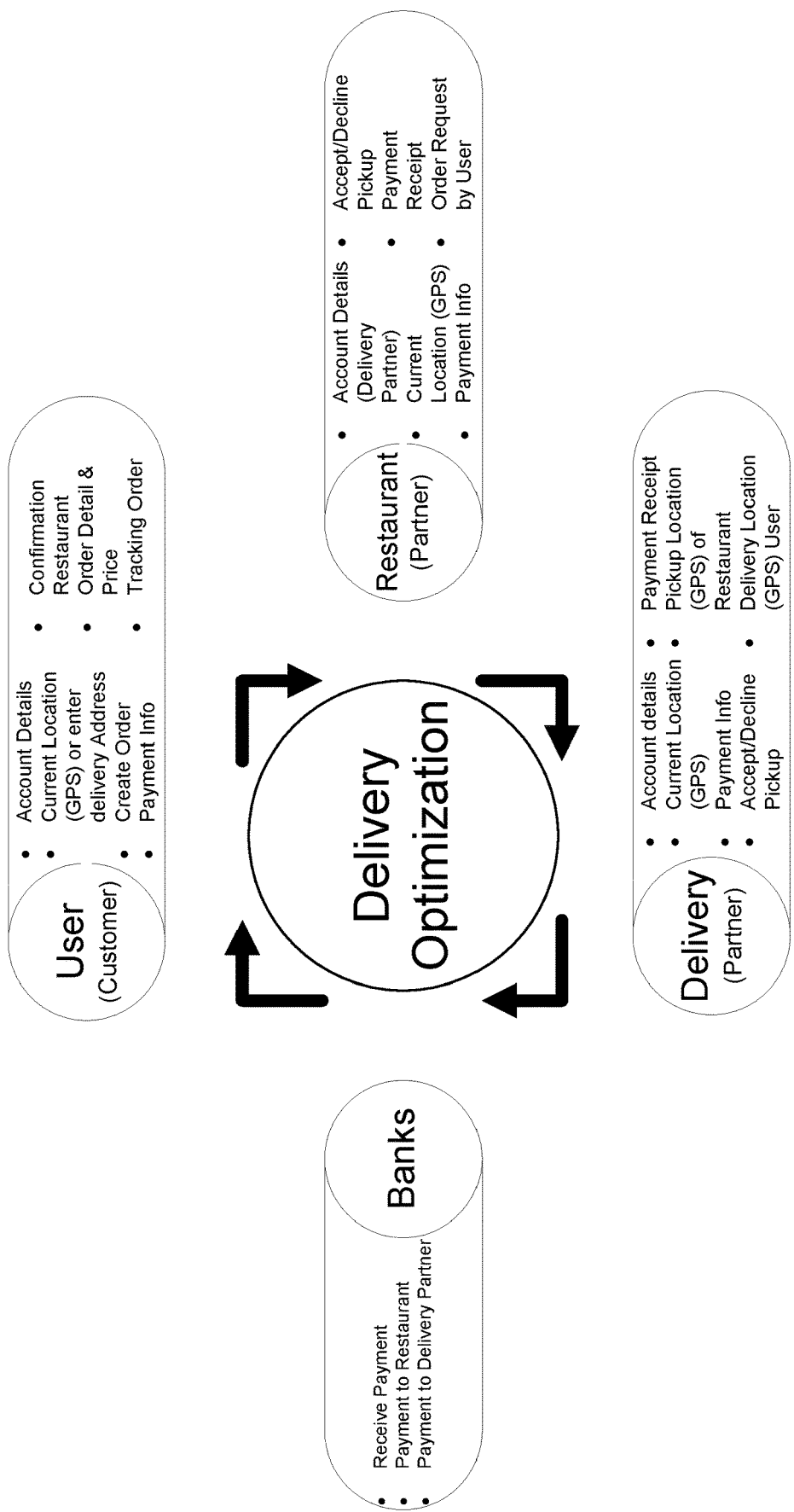
FIG. 20 illustrates a context diagram of payment and funding flow using platform 100 according to an embodiment of the present disclosure.

FIG. 20 illustrates a context diagram of payment and funding flow using platform 100.

Figure 21:
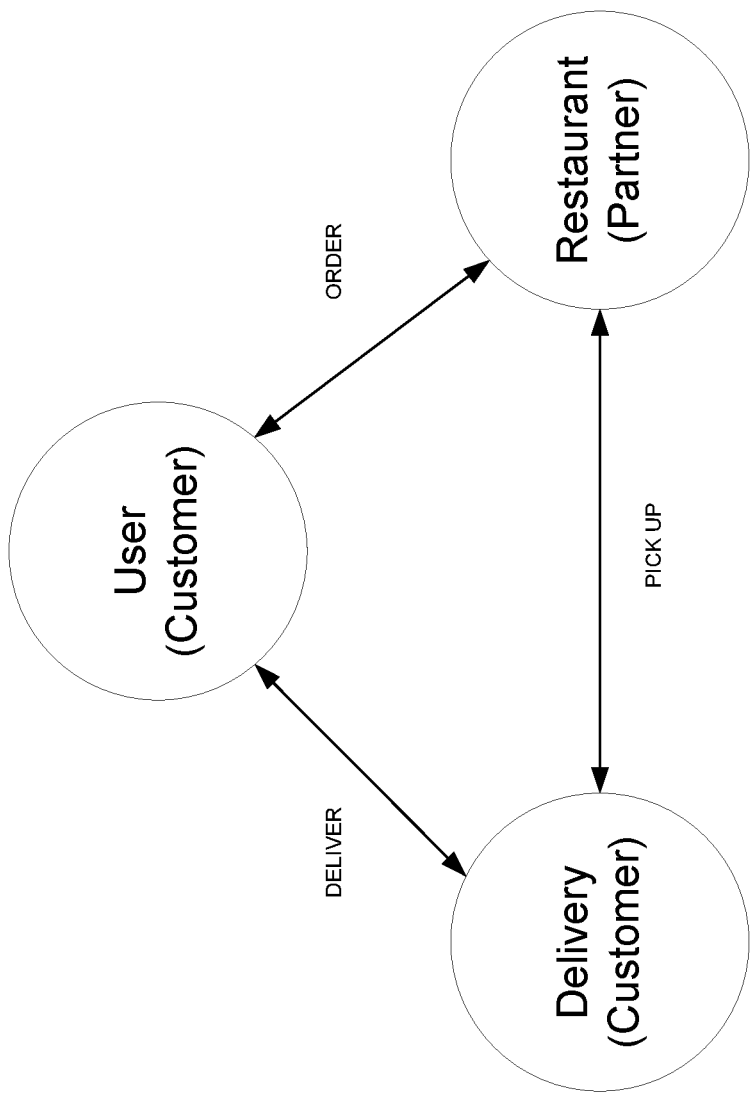
FIG. 21 illustrates a business flow diagram of platform 100 according to an embodiment of the present disclosure.

FIG. 21 illustrates a business flow diagram of platform 100.

Platform Operation

Hereinafter, detailed discussion of the operation of the platform 100 is provided with reference to FIGS. 2-5, & 19 and associated methods of coordinating delivery of a dining experience to customers.

Figure 2:
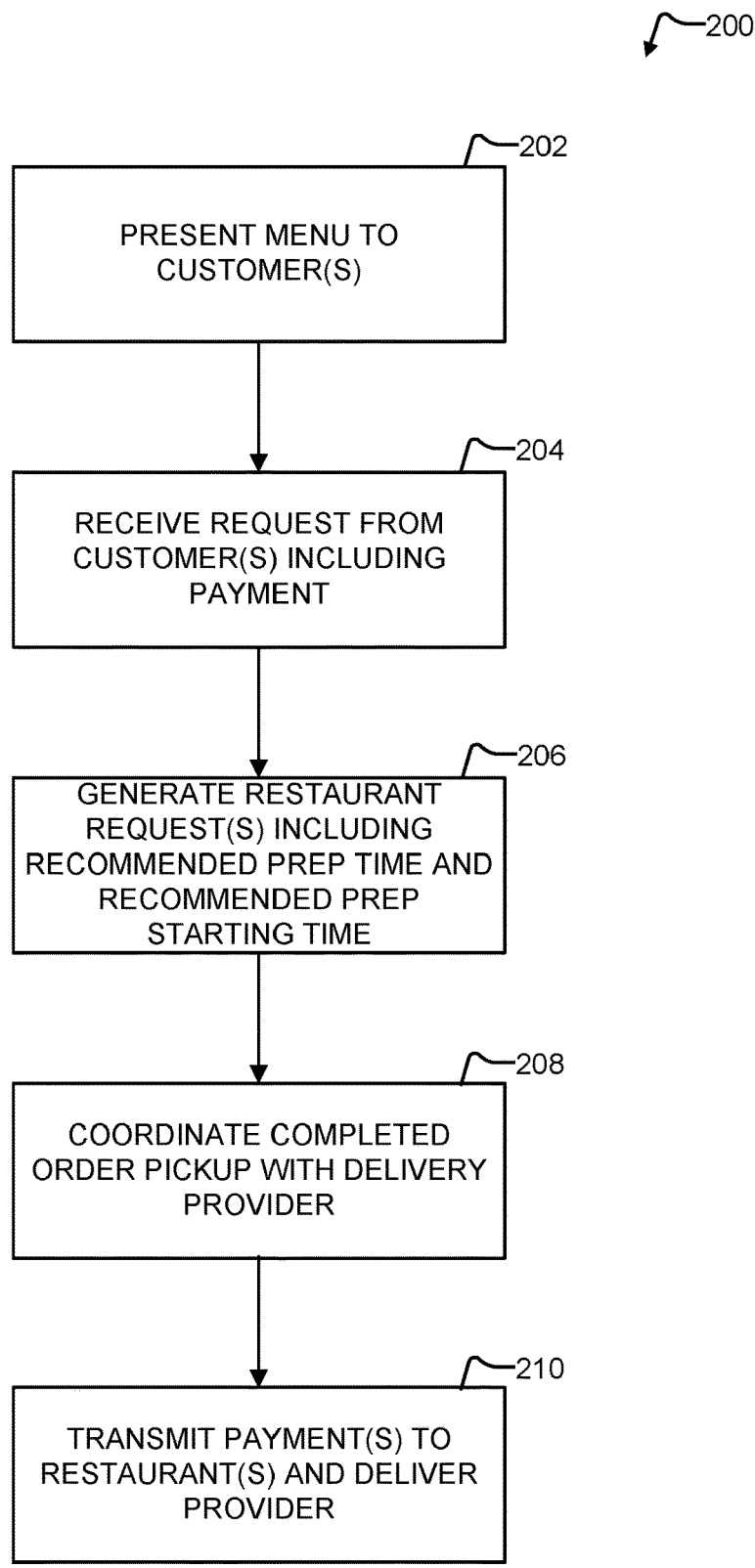
FIG. 2 illustrates a flowchart of a method 200, according to an embodiment of the present disclosure.

FIG. 2 is a flowchart of a method 200, according to an exemplary embodiment of the present disclosure. The method 200 may include presenting a menu or multiple menus from different restaurants to customers, at block 202. The menu may be an aggregated menu of all restaurants 101 to which delivery to the customer is available. The menu may include processing and delivery times, prices, and other data related to a desired dining experience.

The customers may then assemble a request for the desired order items or recipes based on the menu. In response thereto, the method 200 includes receiving the request from the customer, including payment for the order items, at block 204. The request may include all necessary data including delivery address, payment information, contact information, desired delivery time, desired extras or service options, and other relevant data. The request may be for immediately available delivery, delayed delivery, delivery at a particular date, delivery at a particular address, requests for catering services, request for personnel to serve food (e.g., as a catering service), and/or any other options presented through the provided menu.

Upon receipt of the request, the method 200 includes generating processed requests 107 including recommended preparation times, desired pickup times, delivery times, identification of a delivery provider 112, and other processed data, at block 206. The restaurants 101 may user the desired pickup times and/or recommended preparation times to begin preparing one or more portions of the individual requests.

The method 200 may also include coordinating completed order pickup with the delivery provider 112, at block 208. The coordinating may include providing pickup addresses for the restaurants 101, pickup times, traffic data, weather data, and any other data related to facilitating pickup of individual order item portions 114 to generate a completed order 116. The coordinating may further include scheduling data and requests to ensure the delivery provider 112 picks up order item portions 114 at particular times to effectively deliver a desirable dining experience to the customer 104.

Upon successful pickup of order items 114, payment may be transmitted to restaurants 101, at block 210. Furthermore, upon successful delivery of the completed order 116 and dining experience to customer 104, payment may be transmitted to the delivery provider 112. It is noted that according to some embodiments, payment(s) may be transmitted at any time, including in batches for multiple orders, depending upon any desired implementation of the embodiments described herein.

Figure 3:
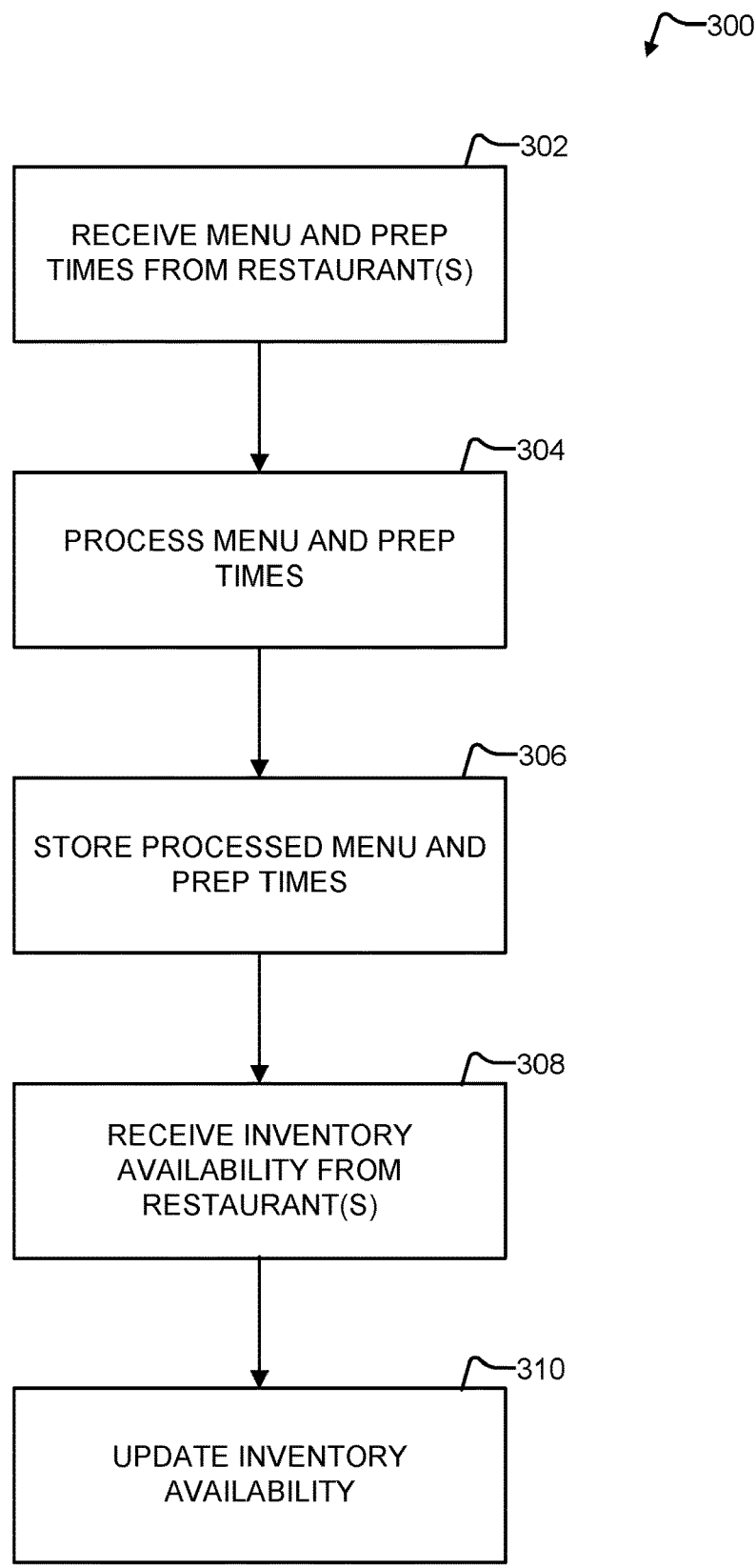
FIG. 3 illustrates a flowchart of a method 300, according to an embodiment of the present disclosure.

FIG. 3 is a flowchart of a method 300, according to an embodiment of the present disclosure. The method 300 relates to creation of the menu provided to customers at block 202.

The method 300 may include receiving a menu with associated order item/recipe preparation times from restaurants 101, at block 302. The food preparation times may be provided by restaurants 101, and may include considerations such as seasonal variations or other considerations.

The menu and preparation times may be processed at block 304, and stored at block 306. Storage may include storage in a database, storage system, storage apparatus, or other storage types by the delivery organizer 108.

Thereafter, or at substantially the same time, the delivery organizer 108 may receive inventory availability from the restaurants 101, at block 308. The inventory availability may be received on a scheduled basis, may be received on-the-fly, may be received in real-time or in substantially real-time, and may be used to determine availability of particular order items and recipes related to the stored menu items associated with each restaurant 101.

The inventory availability may be updated at block 310, such that customers are presented with up-to-date availability of order items such that incorrect multi-restaurant orders are reduced. The inventory availability may also include food preparation hours, operational hours, and other scheduling data.

Using the method 300, the delivery organizer 108 may ensure that customers 104 are effectively provided up-to-date data related to order item availability and scheduling, to facilitate a pleasing dining experience.

Figure 4:
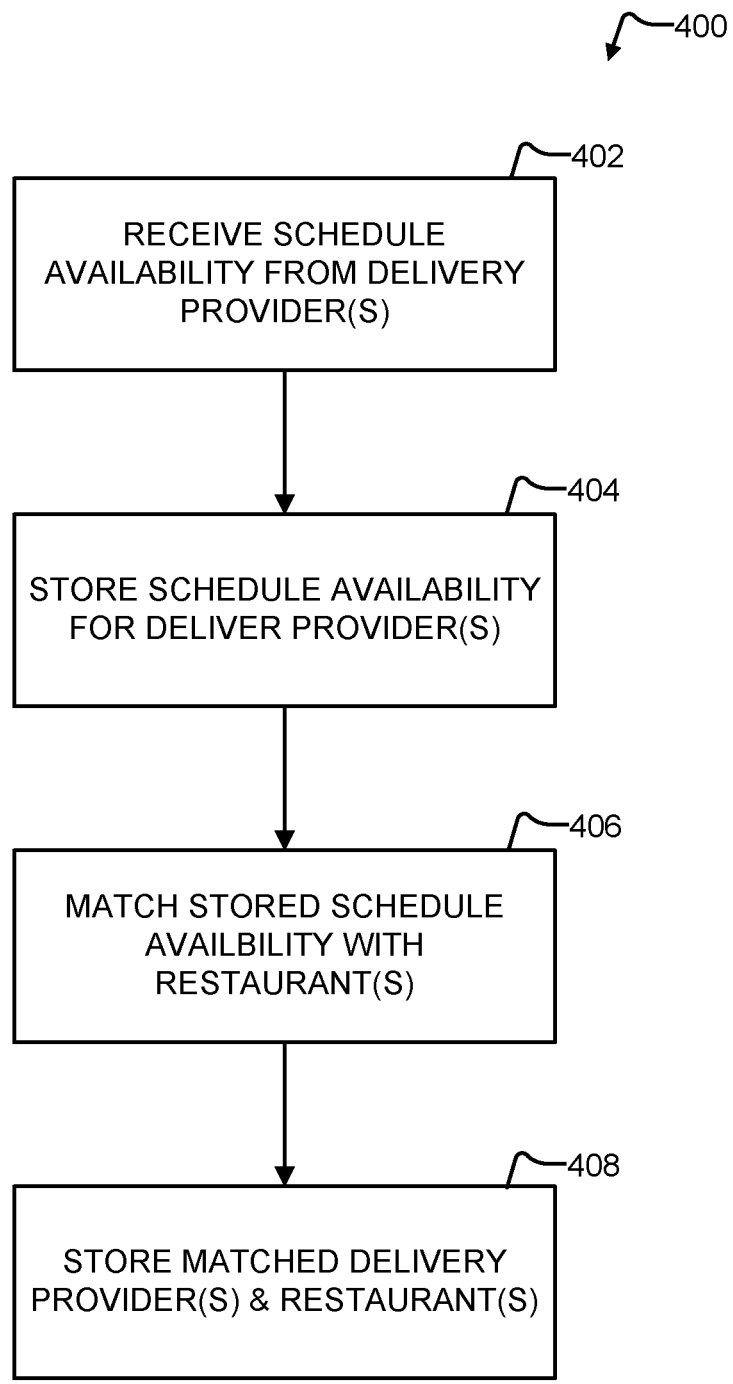
FIG. 4 illustrates a flowchart of a method 400, according to an embodiment of the present disclosure.

FIG. 4 is a flowchart of a method 400, according to an embodiment of the present disclosure. The method 400 relates to maintaining up-to-date data as to availability of delivery providers 112.

The method 400 includes receiving schedule availability from delivery providers 112, at block 402. The schedule availability may include operational hours, particular delivery service member availability, geographical service data, vehicle types, vehicle equipment (heaters, coolers, refrigeration, etc.), vehicle storage capacity, estimated travel speed/times, and other data related to the delivery providers 112.

The schedule availability and associated data may be stored by the delivery organizer 108, at block 404. The storage may be substantially similar to the storage user for restaurants data described above. Additionally, the schedule availability and associated data may be updated on-the-fly, in real-time or substantially real-time, and/or on an ongoing basis. Accordingly, new service members or off-duty service members of the delivery providers 112 may be quickly accounted for.

The method 400 further includes matching the stored schedule availability and associated data with the restaurants 101, at block 406. The matching may include determining geographical overlap, travel times, scheduling overlap, and other considerations. The matching may also include determining if particular delivery providers 112 have correct equipment for transporting completed orders 116 effectively, to ensure a consistently pleasing dining experience for customers 104.

Rating systems and rankings may be provided for delivery providers 112, according to some embodiments. The rankings may also be used in the matching of block 406 to promote better delivery services for higher-quality dining experiences. The matching data may be stored at block 408 for relatively quick processing of desirable delivery providers 112 to restaurants 101 when receiving customer orders.

Figure 5:
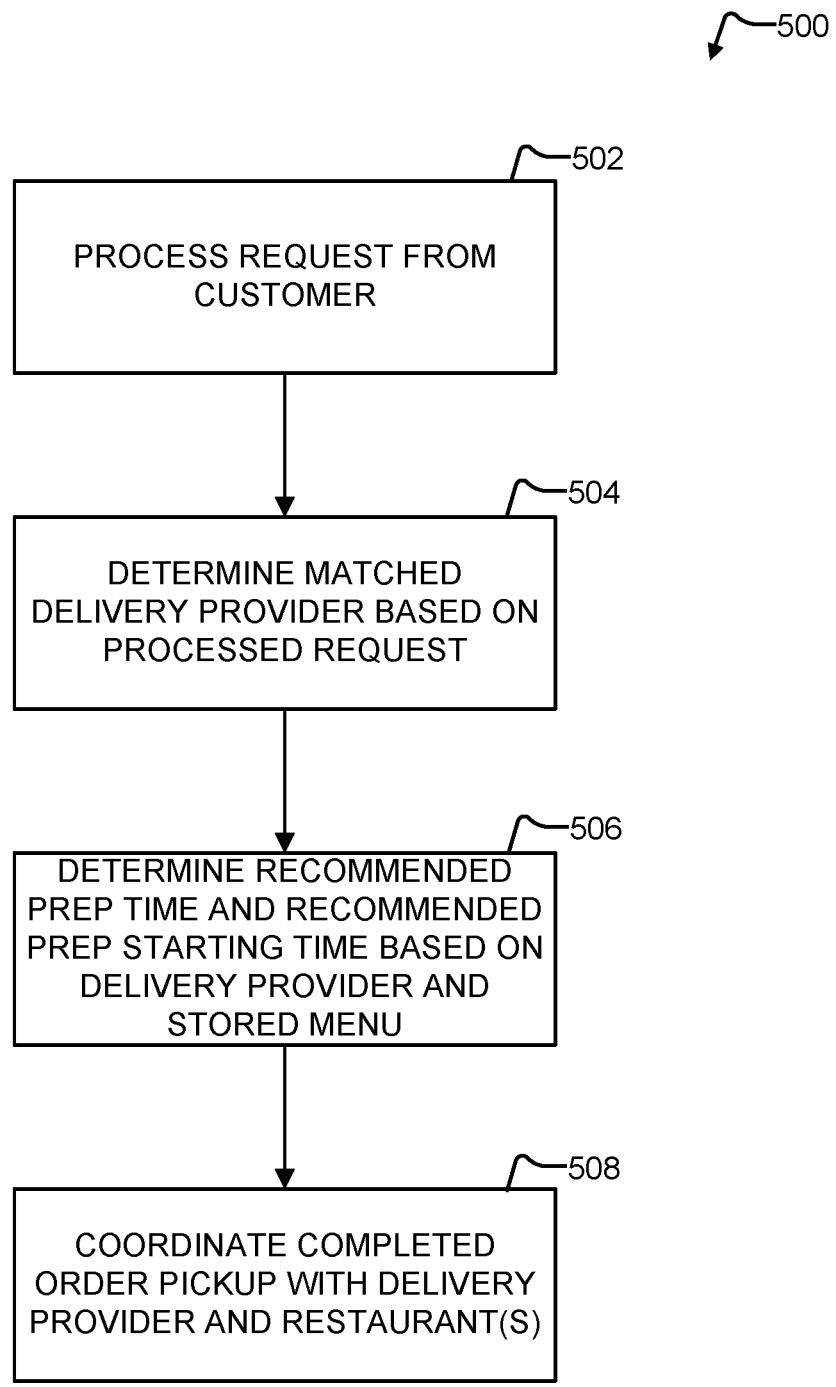
FIG. 5 is a flowchart of a method 500, according to an exemplary embodiment of the present disclosure.

FIG. 5 is a flowchart of a method 500, according to an exemplary embodiment of the present disclosure. The method 500 relates to blocks 206 and 208 of method 200, and coordinating delivery of a dining experience to a customer 104.

The method 500 includes processing a customer order request 106, at block 502. The processing may include determining particular order items associated with particular restaurants 101. The processing may also include determining desired delivery time, estimated preparation and delivery times, estimated traffic delays, estimated weather delays, and other considerations.

Upon processing, the method 500 includes determining a matched delivery provider 112 based on the processing, at block 504. The matched or matching delivery provider 112 may be determined based on stored historical matches (see FIG. 4), based on updated schedule availability, based on ranking, based on vehicle equipment, and other considerations.

After determining an appropriate match or matches, the method 500 includes determining recommended preparation times based on the delivery provider and the stored menu data, at block 506. The recommended preparation times may take all available data, or a portion of available data, into consideration. For example, travel times, traffic delays, weather delays, storage and transport equipment, and other considerations may be applicable to determining when a particular order item should begin to be prepared at a restaurant 101.

Upon establishing and transmitting food preparation data including preparation times, delivery windows, estimated pickup times, and other data, to restaurants 101, the method 500 may include coordinating completed order item pickup with the delivery provider 112 and restaurants 101, at block 508. The coordination may include transmitting associated data to both the delivery provider 112 and restaurants 101 such that the restaurants and delivery providers have the same data and can effectively deliver a consistent and pleasing dining experience to the customers 104.

Figure 19:
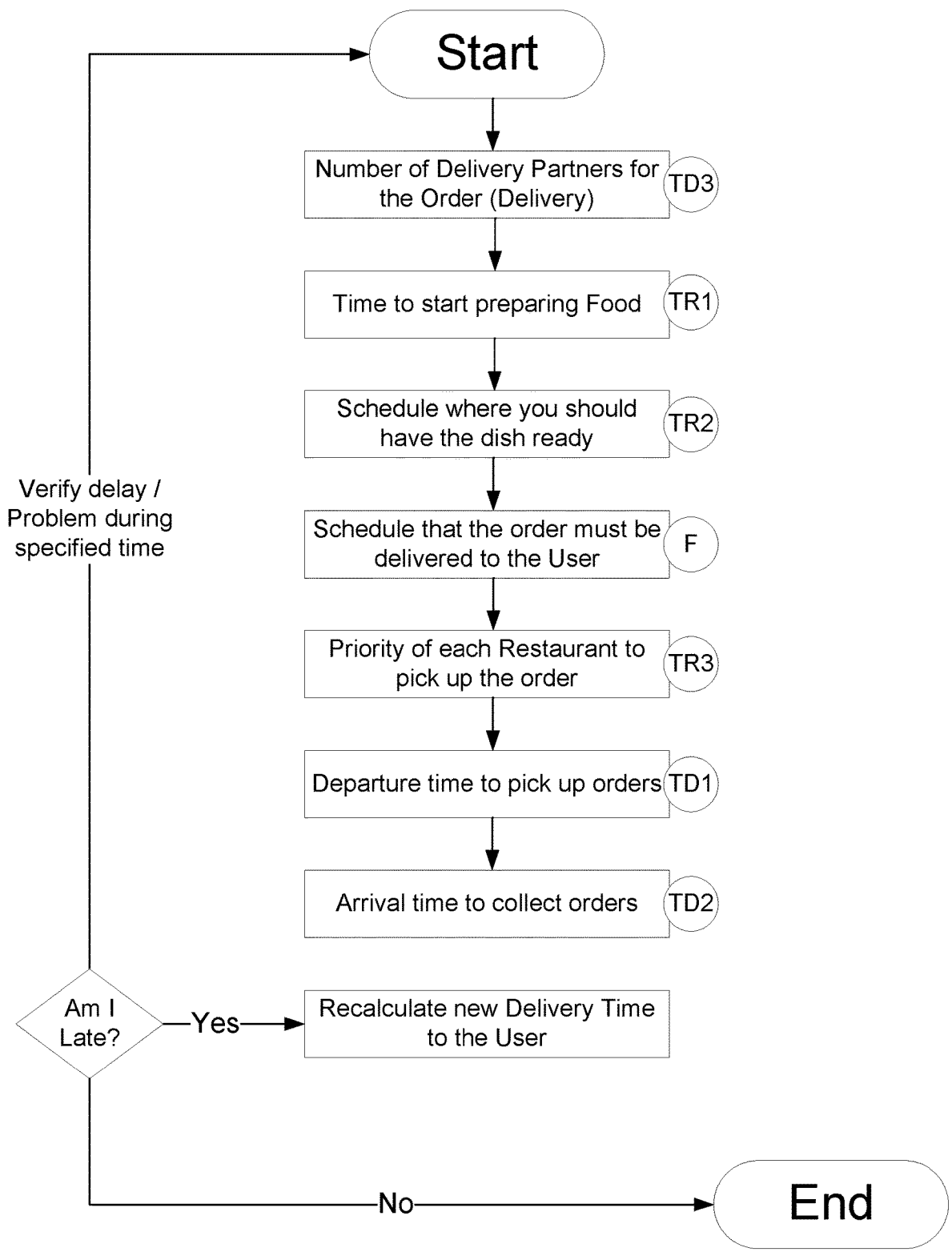
FIG. 19 illustrates a method 2500 incorporating elements of methods 200-500.

FIG. 19 is a flow chart of method 2500 incorporating elements of methods 200-500.

Computing Device Architecture

At least a portion of the platform and/or system 100 and associated components may include aspects embodied as, for example, but not be limited to, a website, a web application, a desktop application, backend application, and a mobile application compatible with a computing device 600. Furthermore, various embodiments may provide for a computing device associated with various aspects of the delivery provider hardware (e.g., vehicle storage and sensing mechanisms associated with the delivered order items, to monitor and report aspects of the food items in delivery route) and various aspects of the kitchen preparing the order items (e.g., as relating to the preparation and storage of the order items, and to monitor and report aspects of the food items during preparation and storage). Said computing device may be configured for bi-directional communication with various aspects of the platform. The computing device 600 may comprise, but not be limited to the following:

Mobile computing devices, such as, but not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

System 100 may be hosted on a centralized server or a cloud computing service. Although method 200, and methods 300, 400, and 500, have been described to be performed by a computing device 600, it should be understood that, in some embodiments, different operations may be performed by a plurality of the computing devices 600 in operative communication at least one network.

Embodiments of the present disclosure may comprise a system having a central processing unit (CPU) 620, a bus 630, a memory unit 640, a power supply unit (PSU) 650, and one or more Input/Output (I/O) units. The CPU 620 coupled to the memory unit 640 and the plurality of I/O units 660 via the bus 630, all of which are powered by the PSU 650. It should be understood that, in some embodiments, each disclosed unit may actually be a plurality of such units for the purposes of redundancy, high availability, and/or performance. The combination of the presently disclosed units is configured to perform the stages any method disclosed herein.

Figure 6:
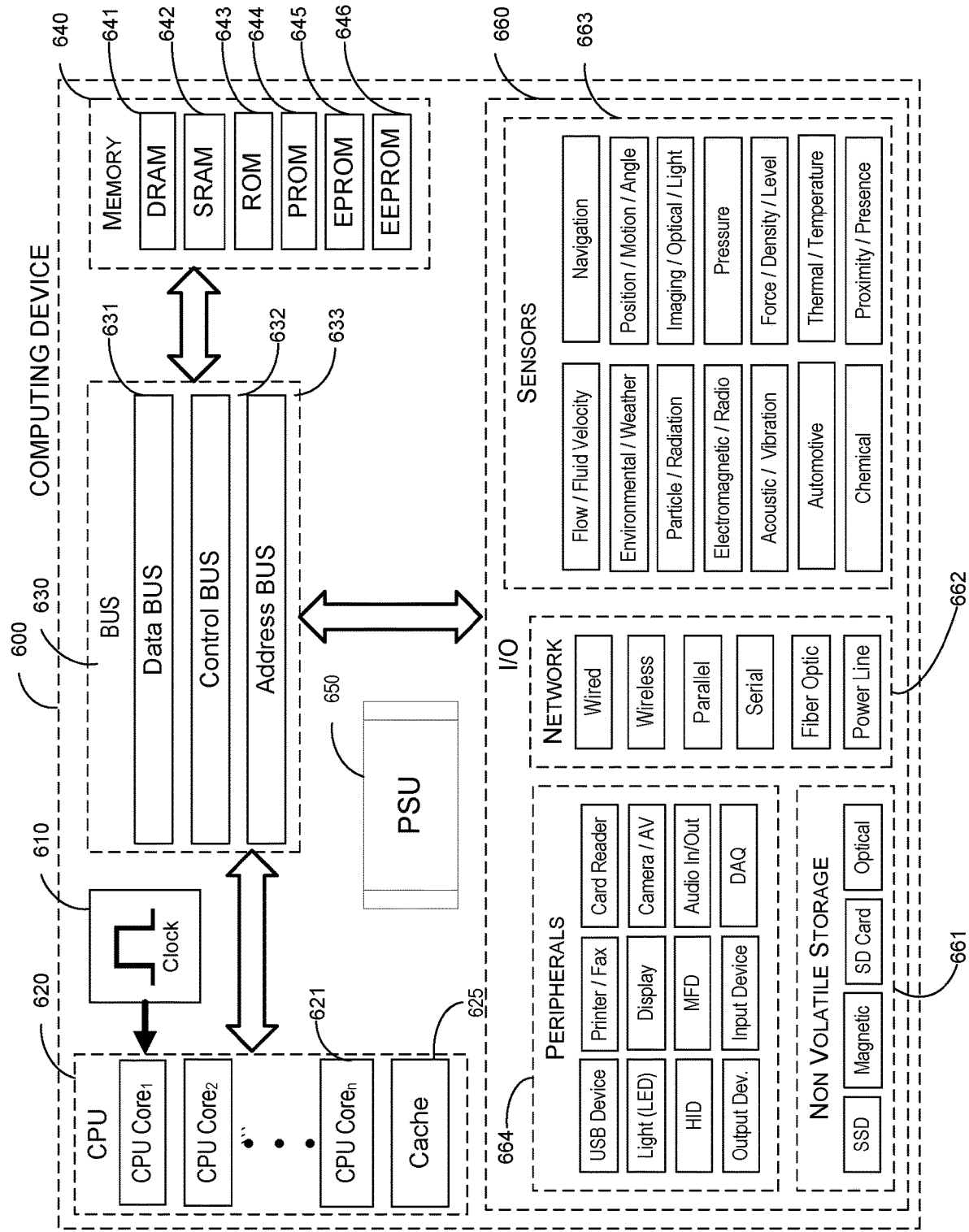
FIG. 6 illustrates a computing device, according to an exemplary embodiment of the present disclosure.

FIG. 6 is a block diagram of a system including computing device 600. Consistent with an embodiment of the disclosure, the aforementioned CPU 620, the bus 630, the memory unit 640, a PSU 650, and the plurality of I/O units 660 may be implemented in a computing device, such as computing device 600 of FIG. 6. Any suitable combination of hardware, software, or firmware may be used to implement the aforementioned units. For example, the CPU 620, the bus 630, and the memory unit 640 may be implemented with computing device 600 or any of other computing devices 600, in combination with computing device 600. The aforementioned system, device, and components are examples and other systems, devices, and components may comprise the aforementioned CPU 620, the bus 630, the memory unit 640, consistent with embodiments of the disclosure.

At least one computing device 600 may be embodied as any of the computing elements illustrated in all of the attached figures. A computing device 600 does not need to be electronic, nor even have a CPU 620, nor bus 630, nor memory unit 640. The definition of the computing device 600 to a person having ordinary skill in the art is "A device that computes, especially a programmable electronic machine that performs high-speed mathematical or logical operations or that assembles, stores, correlates, or otherwise processes information." Any device which processes information qualifies as a computing device 600, especially if the processing is purposeful.

With reference to FIG. 6, a system consistent with an embodiment of the disclosure may include a computing device, such as computing device 600. In a basic configuration, computing device 600 may include at least one clock module 610, at least one CPU 620, at least one bus 630, and at least one memory unit 640, at least one PSU 650, and at least one I/O 660 module, wherein I/O module may be comprised of, but not limited to a non-volatile storage sub-module 661, a communication sub-module 662, a sensors sub-module 663, and a peripherals sub-module 664.

A system consistent with an embodiment of the disclosure the computing device 600 may include the clock module 610 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 620, the central component of modern computers, which relies on a clock. The only exceptions are asynchronous circuits such as asynchronous CPUs. The clock 610 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 600 use a "clock multiplier" which multiplies a lower frequency external clock to the appropriate clock rate of the CPU 620. This allows the CPU 620 to operate at a much higher frequency than the rest of the computer, which affords performance gains in situations where the CPU 620 does not need to wait on an external factor (like memory 640 or input/output 660). Some embodiments of the clock 610 may include dynamic frequency change, where, the time between clock edges can vary widely from one edge to the next and back again.

A system consistent with an embodiment of the disclosure the computing device 600 may include the CPU unit 620 comprising at least one CPU Core 621. A plurality of CPU cores 621 may comprise identical the CPU cores 621, such as, but not limited to, homogeneous multi-core systems. It is also possible for the plurality of CPU cores 621 to comprise different the CPU cores 621, such as, but not limited to, heterogeneous multi-core systems, big.LITTLE systems and some AMD accelerated processing units (APU). The CPU unit 620 reads and executes program instructions which may be used across many application domains, for example, but not limited to, general purpose computing, embedded computing, network computing, digital signal processing (DSP), and graphics processing (GPU). The CPU unit 620 may run multiple instructions on separate CPU cores 621 at the same time. The CPU unit 620 may be integrated into at least one of a single integrated circuit die and multiple dies in a single chip package. The single integrated circuit die and multiple dies in a single chip package may contain a plurality of other aspects of the computing device 600, for example, but not limited to, the clock 610, the CPU 620, the bus 630, the memory 640, and I/O 660.

The CPU unit 620 may contain cache 622 such as, but not limited to, a level 1 cache, level 2 cache, level 3 cache or combination thereof. The aforementioned cache 622 may or may not be shared amongst a plurality of CPU cores 621. The cache 622 sharing comprises at least one of message passing and inter-core communication methods may be used for the at least one CPU Core 621 to communicate with the cache 622. The inter-core communication methods may comprise, but not limited to, bus, ring, two-dimensional mesh, and crossbar. The aforementioned CPU unit 620 may employ symmetric multiprocessing (SMP) design.

The plurality of the aforementioned CPU cores 621 may comprise soft microprocessor cores on a single field programmable gate array (FPGA), such as semiconductor intellectual property cores (IP Core). The plurality of CPU cores 621 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 621, for example, but not limited to Instruction-level parallelism (ILP) such as, but not limited to, super-scalar pipelining, and Thread-level parallelism (TLP).

Consistent with the embodiments of the present disclosure, the aforementioned computing device 600 may employ a communication system that transfers data between components inside the aforementioned computing device 600, and/or the plurality of computing devices 600. The aforementioned communication system will be known to a person having ordinary skill in the art as a bus 630. The bus 630 may embody internal and/or external plurality of hardware and software components, for example, but not limited to a wire, optical fiber, communication protocols, and any physical arrangement that provides the same logical function as a parallel electrical bus. The bus 630 may comprise at least one of, but not limited to a parallel bus, wherein the parallel bus carry data words in parallel on multiple wires, and a serial bus, wherein the serial bus carry data in bit-serial form. The bus 630 may embody a plurality of topologies, for example, but not limited to, a multidrop/electrical parallel topology, a daisy chain topology, and a connected by switched hubs, such as USB bus. The bus 630 may comprise a plurality of embodiments, for example, but not limited to: Internal data bus (data bus) 631/Memory bus; Control bus 632; Address bus 633; System Management Bus (SMBus); Front-Side-Bus (FSB); External Bus Interface (EBI); Local bus; Expansion bus; Lightning bus; Controller Area Network (CAN bus); Camera Link; and/or ExpressCard.

The bus 630 may also comprise a plurality of embodiments, for example, but not limited to: Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.

The bus 630 may also comprise a plurality of embodiments, for example, but not limited to: Small Computer System Interface (SCSI)/Serial Attached SCSI (SAS); HyperTransport; InfiniBand; RapidIO; Mobile Industry Processor Interface (MIPI); Coherent Processor Interface (CAPI); Plug-n-play; 1-Wire.

The bus 630 may also comprise a plurality of embodiments, for example, but not limited to: Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (i.e., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal 10, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

The bus 630 may further comprise a plurality of embodiments, for example, but not limited to: Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).

The bus 630 may comprise a Music Instrument Digital Interface (MIDI), or a Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 600 may employ hardware integrated circuits that store information for immediate use in the computing device 600, know to the person having ordinary skill in the art as primary storage or memory 640. The memory 640 operates at high speed, distinguishing it from the non-volatile storage sub-module 661, which may be referred to as secondary or tertiary storage, which provides slow-to-access information but offers higher capacities at lower cost. The contents contained in memory 640, may be transferred to secondary storage via techniques such as, but not limited to, virtual memory and swap. The memory 640 may be associated with addressable semiconductor memory, such as integrated circuits consisting of silicon-based transistors, used for example as primary storage but also other purposes in the computing device 600. The memory 640 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 641, Static Random-Access Memory (SRAM) 642, CPU Cache memory 625, Advanced Random-Access Memory (A-RAM), and other types of primary storage such as Random-Access Memory (RAM).

Non-volatile memory which can retain stored information even after power is removed, for example, but not limited to, Read-Only Memory (ROM) 643, Programmable ROM (PROM) 644, Erasable PROM (EPROM) 645, Electrically Erasable PROM (EEPROM) 646 (e.g., flash memory and Electrically Alterable PROM [EAPROM]), Mask ROM (MROM), One Time Programable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 600 may employ the communication system between an information processing system, such as the computing device 600, and the outside world, for example, but not limited to, human, environment, and another computing device 600. The aforementioned communication system will be known to a person having ordinary skill in the art as I/O 660. The I/O module 660 regulates a plurality of inputs and outputs with regard to the computing device 600, wherein the inputs are a plurality of signals and data received by the computing device 600, and the outputs are the plurality of signals and data sent from the computing device 600. The I/O module 660 interfaces a plurality of hardware, such as, but not limited to, non-volatile storage 661, communication devices 662, sensors 663, and peripherals 664. The plurality of hardware is used by the at least one of, but not limited to, human, environment, and another computing device 600 to communicate with the present computing device 600. The I/O module 660 may comprise a plurality of forms, for example, but not limited to channel I/O, port mapped I/O, asynchronous I/O, and Direct Memory Access (DMA).

Consistent with the embodiments of the present disclosure, the aforementioned computing device 600 may employ the non-volatile storage sub-module 661, which may be referred to by a person having ordinary skill in the art as one of secondary storage, external memory, tertiary storage, off-line storage, and auxiliary storage. The non-volatile storage sub-module 661 may not be accessed directly by the CPU 620 without using intermediate area in the memory 640. The non-volatile storage sub-module 661 does not lose data when power is removed and may be two orders of magnitude less costly than storage used in memory module, at the expense of speed and latency. The non-volatile storage sub-module 661 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (661) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO); and Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

The non-volatile storage sub-module (661) may also comprise a plurality of embodiments, such as, but not limited to: Magnetic storage such as, but not limited to, Hard Disk Drive (HDD), tape drive, carousel memory, and Card Random-Access Memory (CRAM); Phase-change memory; Holographic data storage such as Holographic Versatile Disk (HVD); Molecular Memory; and/or Deoxyribonucleic Acid (DNA) digital data storage.

Consistent with the embodiments of the present disclosure, the aforementioned computing device 600 may employ the communication sub-module 662 as a subset of the I/O 660, which may be referred to by a person having ordinary skill in the art as at least one of, but not limited to, computer network, data network, and network. The network allows computing devices 600 to exchange data using connections, which may be known to a person having ordinary skill in the art as data links, between network nodes. The nodes comprise network computer devices 600 that originate, route, and terminate data. The nodes are identified by network addresses and can include a plurality of hosts consistent with the embodiments of a computing device 600. The aforementioned embodiments include, but not limited to personal computers, phones, servers, drones, and networking devices such as, but not limited to, hubs, switches, routers, modems, and firewalls.

Two nodes can be said are networked together, when one computing device 600 is able to exchange information with the other computing device 600, whether or not they have a direct connection with each other. The communication sub-module 662 supports a plurality of applications and services, such as, but not limited to World Wide Web (WWW), digital video and audio, shared use of application and storage computing devices 600, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 662 may comprise a plurality of size, topology, traffic control mechanism and organizational intent. The communication sub-module 662 may comprise a plurality of embodiments, such as, but not limited to: Wired communications, such as, but not limited to, coaxial cable, phone lines, twisted pair cables (ethernet), and InfiniBand; Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 4G (such as WiMax and LTE), and 5G (short and long wavelength); Parallel communications, such as, but not limited to, LPT ports; Serial communications, such as, but not limited to, RS-232 and USB; Fiber Optic communications, such as, but not limited to, Single-mode optical fiber (SMF) and Multi-mode optical fiber (MMF); and/or Power Line communications.

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 600 may employ the sensors sub-module 663 as a subset of the I/O 660. The sensors sub-module 663 comprises at least one of the devices, modules, and subsystems whose purpose is to detect events or changes in its environment and send the information to the computing device 600. Sensors are sensitive to the measured property, are not sensitive to any property not measured, but may be encountered in its application, and do not significantly influence the measured property. The sensors sub-module 663 may comprise a plurality of digital devices and analog devices, wherein if an analog device is used, an Analog to Digital (A-to-D) converter must be employed to interface the said device with the computing device 600. The sensors may be subject to a plurality of deviations that limit sensor accuracy. The sensors sub-module 663 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 600 may employ the peripherals sub-module 662 as a subset of the I/O 660. The peripheral sub-module 664 comprises ancillary devices uses to put information into and get information out of the computing device 600. There are 3 categories of devices comprising the peripheral sub-module 664, which exist based on their relationship with the computing device 600, input devices, output devices, and input/output devices. Input devices send at least one of data and instructions to the computing device 600. Input devices can be categorized based on, but not limited to: Modality of input, such as, but not limited to, mechanical motion, audio, visual, and tactile; Whether the input is discrete, such as but not limited to, pressing a key, or continuous such as, but not limited to position of a mouse; The number of degrees of freedom involved, such as, but not limited to, two-dimensional mice vs three-dimensional mice used for Computer-Aided Design (CAD) applications; Output devices provide output from the computing device 600. Output devices convert electronically generated information into a form that can be presented to humans. Input/output devices perform that perform both input and output functions.

It should be understood by a person having ordinary skill in the art that the ensuing are non-limiting embodiments of the aforementioned peripheral sub-module 664: Input Devices; Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 600. The information can be stored in a multitude of formats depending on the user's requirement. Examples of types of video input devices include, but not limited to, digital camera, digital camcorder, portable media player, web cam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 600 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data AcQuisition (DAQ) devices covert at least one of analog signals and physical parameters to digital values for processing by the computing device 600. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 662 sub-module), data storage device (non-volatile storage 661), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

Aspects

The following disclose various Aspects of the present disclosure. The various Aspects are not to be construed as patent claims unless the language of the Aspect appears as a patent claim. The Aspects describe various non-limiting embodiments of the present disclosure.

Aspects include:

Aspect 1: Roles:

1) End User: Requesting multi-order orders, searching the application by restaurant, type of food, diet, etc. And configure the payment method to perform the checkout process.

2) Delivery Partner: Will be responsible for collecting the orders and delivering them to the end user in the expected time.

3) Restaurant: Will prepare the orders (meals) according to the schedule planned by the platform.

4) Administrator: Will make general settings within the platform. He will also be able to participate in the process of approval/rejection for the registration of Restaurants and Delivery partners in case it is necessary.

Aspect 2: End User Cycle—The life cycle of the end user within the platform includes the following events:

1) End User registration/Authorization.

2) Search for meals, restaurants, types of ingredients, types of diets, scores, discounts.

3) Creation of an order with multiple orders.

4) Order confirmation and payment data (it will allow to divide the payment between the guests who have the application installed in their cell phones).

5) Order tracking.

6) Reception of the order and qualification of the service.

Aspect 3: Restaurant Life Cycle—The life cycle of the Restaurant within the platform includes the following events:

1) Restaurant Registration
2) Process validation
  a. Terms and Conditions
  b. Presentation of required legal documents
  c. Bank account to receive payment
  d. Approval/Rejection by the platform
3) Profile configuration for restaurants
  a. Creation of the food catalog
  b. Uploading images
  c. Detail of ingredients
  d. Diet details
  e. Preparation times for each meal
  f. Delay times at peak times
4) Order Confirmation/Rejection
5) Orders Preparation
6) Food ready to be delivered to the delivery partner Aspect 4: Delivery Partner Life Cycle—The life cycle of the Delivery Partner within the platform includes the following events:

1) Delivery Partner Registration
2) Process validation
  a. Presentation of required legal documents
  b. Bank account to receive payment
  c. Terms and conditions
  d. Approval/Rejection by the platform
3) Order Acceptance/Rejection
4) Order pickup
5) Delivery of the order to the end user's address Aspect 5: Roles and Permissions:

1) Administrator:
  a. User management (Add users Administrators, Customer service)
  b. Disable/Enable access accounts on the platform.
  c. Revision and validation of documentation for restaurants and delivery partners.
  d. Communications Management (Restaurants, delivery staff or end user, customer service)

e. General data configuration on the platform for the Delivery Optimization algorithm.
f. Reports: costs, billing, total orders, most requested meals, restaurants etc.
2) Restaurant:
a. Register on the platform
b. Approval/Rejection for the onboarding process
c. Profile data configuration
d. Creation of the food catalog
e. Acceptance/Rejection of Orders
f. Communications Management
3) Delivery Partners
a. Register on the platform
b. Approval/Rejection for the onboarding process
c. Profile data configuration
d. Creation of the food catalog
e. Acceptance/Rejection of pickup Orders
f. Communications Management
4) End User:
a. Register on the platform
b. Advanced search for foods, restaurants, diets, ingredients, etc.
c. Creation and confirmation of the order.
d. Order status tracking
e. Receipt of the order and qualification of the service
f. Communications Management Aspect 6: Platform Components:
1) Mobile Application: The mobile application briefly describes the utility and value of the platform. Will be used by end users, delivery partners and restaurants for order tracking. The end users will be able to create multi-order orders, while the restaurant and the delivery partners will confirm through the platform if they accept the order.
2) Optimization Algorithm: It will be an internal service of the platform that can be consumed, receiving certain parameters to return the optimization results in the delivery process.
3) Back-office web (out of scope for phase 1): The back-office will be used by "Delivery Optimization" administrators to manage users, view their account details (user data, orders placed, amounts, etc.).
4) The back-office will also create and manage the restaurant's food catalogs (images, ingredients, preparation times, etc.)
5) Website landing page (out of scope for phase 1): Landing page which describes the utility and value of the app and provides a link to download it to mobile devices Aspect 7: Operations Enabled for Users:
1. Access the landing page:
a. It shows the utility and benefits that the use of the platform brings to the user.
b. It will be automatically visible the first time a user enters the platform. (Previous to login/registration screen).
c. Access to User Registration
2. Access to the Home page of the site once registered (Logged on user)
a. It will display the last orders generated, types of meals of preference, promotions, restaurants, etc.
b. Registered users will have access to the platform
3. Advanced food search
a. Users can search for restaurants, types of food by types of ingredients, types of diet, etc.
4. View my orders
a. The end user will be able to view the total number of orders placed on the platform. As well as the frequent places.
5. View Favorites
a. The end user can view the restaurants and meals saved as favorites for future use.
6. Create an order with multiple orders
a. You can generate an order with several orders (meals from one or different restaurants)
7. Order status tracking through geolocation
a. Visualization status of the order, as well as the geolocation where the order is located on the map.
8. Profile data configuration
a. Users will be able to update their profile data, such as delivery addresses, payment methods, etc.
9. Split payments
a. Before confirming the order, the end user can decide if the payment is divided among other users who have been invited to participate in the order request.
10. Communications
a. Sending messages between the end user and the delivery man through the platform or WhatsApp.
b. Contact the support of the platform in case of starting a claim.
11. Visualization of FAQs
a. Users can access the FAQ section.

Aspect 8: Operations enabled for the Administrators:
1) Create other users Administrators
2) Display a list of registered users.
b. Access to list of registered users, profile data, email, name and contact information.
c. View and approve pending user registration.
d. View a list of history with user transactions.
3) Approve/Reject Restaurants on the platform
4) Set parameters required for the optimization algorithm
a) Standard tolerance time for the entire delivery process
b) Quantity of orders per delivery for optimal food delivery
c) Incentives for delivery partners and restaurants based on the service provided.
5) Access to dashboard section with reports
a) Billing report.
b) Report on the number of users for each profile.
c) Transaction history report.
d) Report with the detail of the Restaurant's fees.
e) Report of transactions distinguished by type/amount/period of time.
f) Report of most requested types of meals.
6) Communications:
a) Messaging from the platform with the restaurants, Call Center.

Aspect 9: Operations enabled for Restaurants:
1) Access to the landing page:
a) Describes the main objective of the platform and benefits.
2) Access to the registration process:
a) Access to the onboarding process once the documents have been uploaded
b) Waiting for approval/rejection from the platform
3) Access the home page (Once the registration process has been approved)
4) Creation of the Catalogue of meals and details of the restaurant:
a) Loading of dishes
b) Images
c) Ingredient
d) Preparation time e) Maximum conservation time
f) Opening and closing hours
g) Delay time during peak hours
5) Acceptance/Rejection of an Order
6) Access to performance dashboard
a) Display metrics and indicators of the orders placed.
b) Visualize the amount of your sales.
c) Visualize an accumulation of monthly and annual orders.
d) Visualize the score that the end user qualifies to the restaurant.
e) View a history of transactions.
7) Creation of promotions
8) Visualize geolocation of the delivery partner on the map
9) Communications with the platform in case of delays.

Aspect 10: Operations enabled for Delivery partners:
1) Access to the landing page:
a) Describes the main objective of the platform and benefits.
2) Access to the registration process:
a) Access to the onboarding process once the documents have been uploaded
b) Waiting for approval/rejection from the platform
3) Access the home page (Once the registration process has been approved)
4) Acceptance/Rejection of an Order
5) Display position and route on the map points for pickup
a) Display departure times to the restaurant.
b) Visualize arrival times for the collection of the order.
c) Visualize the restaurants to pick up.
d) Visualize address of the end user for the delivery of the order.
6) Visualize position and route on the map for the pick-up and delivery to the end user.
7) Communications with the platform in case of delays.

Aspect 11: Common operations to user profiles:
1) Registration
a) Select "Register" on the platform, entering your name, username, password and profile type (End User, Restaurant or Dealer). Restaurants and Delivery Partners must complete the document validation process.
b) The user can register via the social network or with an email account.
c) Once the registration process is completed the user will receive a welcome email.
2. Login and Logout
a) A user enters his email and password to log in
b) A user can log out at any time, as well as log out automatically after a certain amount of time of inactivity for security reasons.
3. Modify your profile data and password
a) Users can change their password, main account email and contact details.
b) To make any of these changes, the Investor must re-confirm their identity using their current password.
4. Recovering your password if you have forgotten it
a) A user can retrieve their password by entering their account email. If the email exists in the user base, the user will receive an email with a one-time link that will allow them to create a new password.

The following is claimed:

1. A method for executing a multi-restaurant order, the method comprising:
receiving the multi-restaurant order, by a delivery organizer from a software interface, wherein the delivery organizer is a software application executing on a computer, the multi-restaurant order comprising a plurality of order items associated with a plurality of restaurants from at least one customer;
retrieving, by the delivery organizer, the following information associated with a first order item, of the plurality of order items, the first order item being associated with a first restaurant:
a first preparation time information, and
a first order temperature information;
retrieving, by the delivery organizer, the following information associated with a second order item, of the plurality of order items, the second order item being associated with a second restaurant:
a second preparation time information, and
a second order temperature information;
scheduling pickup times, by the delivery organizer, for at least one delivery provider to pick up the first order item and the second order item based on the following:
geolocation data of the first restaurant and the second restaurant,
comparing a target temperature of at least one of the first order item and the second order item with at least one of the following:
the first order temperature information, and
the second order temperature information, and
a target delivery time for the multi-restaurant order;
scheduling, based on order data, a first time to begin preparation of the first order item and a second time to begin preparation of the second order item;
transmitting, by the delivery organizer, the scheduled first time to begin preparation to the first restaurant;
transmitting, by the delivery organizer, the scheduled second time to begin preparation to the second restaurant;
transmitting, by the delivery organizer, the pickup times to the at least one delivery provider;
monitoring, by the delivery organizer, preparation times associated with the first order item and the second order item at their respective restaurants to detect one or more delays; and
transmitting, by the delivery organizer, based on the monitoring, a notification to one or more delivery providers to adjust one or more of the pickup times.

2. The method of claim 1, wherein transmitting the pickup times to the at least one delivery provider comprises transmitting the pickup times to a plurality of delivery drivers.

3. The method of claim 1, further comprising assigning at least one additional delivery provider in order to deliver the first order item and the second order item within the target delivery time.

4. The method of claim 1, further comprising assigning at least one prerequisite item relating to the multi-restaurant order, the at least one prerequisite item comprising at least one of the following:
at least one thermal container;
at least one chafing apparatus; and
at least one cooler.

5. The method of claim 1, wherein receiving the multi-restaurant order further comprises receiving at least one of the following:
at least one delivery address;
payment information of the at least one customer;
contact information of the at least one customer;
the target delivery time; and
desired service options.

6. The method of claim 1, further comprising receiving a completion indicator upon a completed delivery from the at least one delivery provider to a customer of the multi-restaurant order.

7. The method of claim 6, further comprising transmitting payment from the customer to at least one of the following based on the completion indicator:
the first restaurant;
the second restaurant; and
the at least one delivery provider.

8. The method of claim 1, further comprising: receiving an indication from the first restaurant as to a delay in the first preparation time associated with the first order item.

9. The method of claim 1, further comprising: recalculating and adjusting the second time to begin preparation of the second order item.

10. The method of claim 1, further comprising at least one of the following:
modifying, upon a modification request of the first restaurant, the first preparation time information associated with preparing the first order item; and
modifying, upon a modification request of the second restaurant, the second preparation time information associated with preparing the second order item.

11. A multi-restaurant order execution system comprising:
a memory storage; and
a processing unit coupled to the memory storage, the processing unit being configured to perform the following:
receive a multi-restaurant order, by a delivery organizer from a software interface, wherein the delivery organizer is a software application executing on a computer, the multi-restaurant order comprising a plurality of order items associated with a plurality of restaurants from at least one customer,
retrieve, by the delivery organizer, the following information associated with a first order item, of the plurality of order items, the first order item being associated with a first restaurant:
a first preparation time information, and
a first order temperature information,
retrieve, by the delivery organizer, the following information associated with a second order item, of the plurality of order items, the second order item being associated with a second restaurant:
a second preparation time information, and
a second order temperature information,
schedule pickup times, by the delivery organizer, for at least one delivery provider to pick up the first order item and the second order item based on the following:
geolocation data of the first restaurant and the second restaurant,
a comparison of a target temperature of at least one of the first order item and the second order item with at least one of the following:
the first order temperature information, and
the second order temperature information, and
a target delivery time for the multi-restaurant order,
schedule, based on order data, a first time to begin preparation of the first order item and a second time to begin preparation of the second order item,
transmit, by the delivery organizer, the scheduled first time to begin preparation to the first restaurant,
transmit, by the delivery organizer, the scheduled second time to begin preparation to the second restaurant,
transmit, by the delivery organizer, the pickup times to the at least one delivery provider,
monitor, by the delivery organizer, preparation times associated with the first order item and the second order item at their respective restaurants to detect one or more delays, and
transmit, by the delivery organizer, a notification to one or more delivery providers to adjust one or more of the pickup times.

12. The system of claim 11, wherein the one or more delivery providers comprises at least one of the following:
a robot;
a drone; and
a driverless vehicle.

13. The system of claim 11, wherein the first preparation time information comprises a time associated with preparing the first order item associated with the first restaurant.

14. The system of claim 11, further configured to assign at least one prerequisite item relating to the multi-restaurant order, the at least one prerequisite item comprising at least one of the following:
at least one thermal container;
at least one chafing apparatus; and
at least one cooler.

15. The system of claim 11, wherein receiving the multi-restaurant order further comprises receiving at least one of the following:
at least one delivery address;
payment information of the at least one customer;
contact information of the at least one customer; and
desired service options.

16. The system of claim 11, further configured to receive a completion indicator upon a completed delivery from the one or more delivery providers to the at least one customer of the multi-restaurant order.

17. The system of claim 16, further configured to transmit payment from the at least one customer to at least one of the following based on the completion indicator:
the first restaurant;
the second restaurant; and
the at least one delivery provider.

18. The system of claim 11, further configured to receive an indication from the first restaurant as to a delay in the first time to begin preparation of the first order item.

19. The system of claim 11, further configured to recalculate and adjust the second time to begin preparation of the second order item.

20. A non-transitory computer readable medium comprising a set of instructions which, when executed by a computer, perform a method, the method comprising:
receiving a multi-restaurant order, by a delivery organizer from a software interface, wherein the delivery organizer is a software application executing on the computer, the multi-restaurant order comprising a plurality of order items associated with a plurality of restaurants from at least one customer;
retrieving, by the delivery organizer, the following information associated with a first order item, of the plurality of order items, the first order item being associated with a first restaurant:
a first preparation time information, and
a first order temperature information;
retrieving, by the delivery organizer, the following information associated with a second order item, of the plurality of order items, the second order item being associated with a second restaurant:

a second preparation time information, and
a second order temperature information;
scheduling pickup times, by the delivery organizer, for at least one delivery provider to pick up the first order item and the second order item based on the following:
  geolocation data of the first restaurant and the second restaurant,
  comparing a target temperature of at least one of the first order item and the second order item with at least one of the following:
    the first order temperature information, and
    the second order temperature information, and
  a target delivery time for the multi-restaurant order;
scheduling, based on order data, a first time to begin preparation of the first order item and a second time to begin preparation of the second order item;
transmitting, by the delivery organizer, the scheduled first time to begin preparation to the first restaurant;
transmitting, by the delivery organizer, the scheduled second time to begin preparation to the second restaurant;
transmitting, by the delivery organizer, the pickup times to the at least one delivery provider;
monitoring, by the delivery organizer, preparation times associated with the first order item and the second order item at their respective restaurants to detect one or more delays; and
transmitting, by the delivery organizer, based on the monitoring, a notification to one or more delivery providers to adjust one or more of the pickup times.

* * * * *